US012644469B2

(12) United States Patent
Wenger et al.

(10) Patent No.: US 12,644,469 B2
(45) Date of Patent: Jun. 2, 2026

(54) FLUID TRANSFER PUMP AND METHOD OF OPERATION

(71) Applicant: The Gorman-Rupp Company, Mansfield, OH (US)

(72) Inventors: Matthew Wenger, Fort Wayne, IN (US); Canlong He, St. Peters, MO (US)

(73) Assignee: The Gorman-Rupp Company, Mansfield, OH (US)

( * ) Notice: Subject to any disclaimer, the term of this patent is extended or adjusted under 35 U.S.C. 154(b) by 20 days.

(21) Appl. No.: 18/737,255

(22) Filed: Jun. 7, 2024

(65) Prior Publication Data

US 2024/0410390 A1     Dec. 12, 2024

Related U.S. Application Data

(60) Provisional application No. 63/471,894, filed on Jun. 8, 2023.

(51) Int. Cl.
| | |
|---|---|
| *F04D 29/42* | (2006.01) |
| *B23K 20/10* | (2006.01) |
| *F04D 13/06* | (2006.01) |
| *F04D 29/62* | (2006.01) |

(52) U.S. Cl.
CPC ............ *F04D 29/426* (2013.01); *B23K 20/10* (2013.01); *F04D 13/068* (2013.01); *F04D 13/0693* (2013.01); *F04D 29/628* (2013.01)

(58) Field of Classification Search
CPC .... F04D 29/426; F04D 29/628; F04D 29/605; F04D 13/0693; F04D 13/068; B23K 20/10
See application file for complete search history.

(56) References Cited

U.S. PATENT DOCUMENTS

| | | | | |
|---|---|---|---|---|
| 3,465,681 | A * | 9/1969 | Zimmermann ....... | F04D 13/025 |
| | | | | 310/104 |
| 10,544,787 | B2 * | 1/2020 | Li ......................... | F04D 29/708 |
| 10,683,868 | B2 * | 6/2020 | Nowitzki .............. | F04D 13/086 |
| 11,286,940 | B2 * | 3/2022 | Otsuki .................. | F04D 29/041 |

(Continued)

OTHER PUBLICATIONS

International Search Report and Written Opinion dated Sep. 19, 2024, in corresponding International application No. PCT/US24/32990, filed Jun. 7, 2024. (19 pages).

*Primary Examiner* — Dapinder Singh

(74) *Attorney, Agent, or Firm* — Watts Law LLC; John A. Yirga, Esq.; Jillian L. Gosser, Esq.

(57) ABSTRACT

A compact fluid transfer pump assembly and method of assembly is disclosed. The compact fluid transfer pump assembly includes a pump enclosure having a pump cavity sized to house a plurality of pump components and an inlet for receiving fluid, a motor enclosure coupled to the pump enclosure having a circular first end spaced by a cylindrical wall having an inner and an outer surface to a circular second end, a motor enclosure cavity formed therebetween within the cylindrical wall, the circular first end having an opening for receiving a motor, the circular second end formed by a bell wall, the motor enclosure removably couplable with a tank and an anti-rotation foot removably coupled with the motor enclosure and extending from the outer surface of the cylindrical wall of the motor enclosure, the anti-rotation foot to assist in coupling the pump assembly with an external fluid reservoir.

19 Claims, 34 Drawing Sheets

_10_

(56) References Cited

U.S. PATENT DOCUMENTS

| | | | | |
|---|---|---|---|---|
| 11,509,188 | B2 * | 11/2022 | Leisinger | ............... H02K 15/14 |
| 2008/0292454 | A1 * | 11/2008 | Brunner | ................. F04D 1/063 |
| | | | | 415/199.2 |
| 2012/0114512 | A1 | 5/2012 | Lofy et al. | |
| 2013/0106217 | A1 | 5/2013 | Drye | |
| 2013/0259720 | A1 | 10/2013 | Mills et al. | |
| 2015/0016993 | A1 * | 1/2015 | Larson | .................... F16C 33/08 |
| | | | | 29/888.025 |
| 2018/0258938 | A1 | 9/2018 | Mikkelsen | |
| 2023/0124263 | A1 | 4/2023 | Pierce | |

* cited by examiner

_10_

_10_

*10*

*25A*

FLUID TRANSFER PUMP AND METHOD OF OPERATION

CROSS REFERENCES TO RELATED APPLICATIONS

The following application claims priority under 35 U.S. C. § 119 (e) to U.S. Provisional Patent Application Ser. No. 63/471,894 filed Jun. 8, 2023 entitled FLUID TRANSFER PUMP AND METHOD OF OPERATION. The above-identified application is incorporated herein by reference in its entirety for all purposes.

TECHNICAL FIELD

The present disclosure generally relates to a compact fluid transfer pump assembly and method of operation, and more particularly, a compact fluid transfer pump assembly having a motor shroud with an anti-rotation foot.

BACKGROUND

Fluid transfer pumps move fluid from one location to another. One example includes a pump that acts as a conduit to move fluid such as fuel from a portable fuel container to refill engine powered tools, lawn mowers, trucks, boat engines, generators, snowmobiles, ATVs, and other equipment that runs on fuel. The pump may employ vanes, impellers, or other like structures that are rotated inside the pump via some motive force such as an electric motor. The impellers are located in a pump enclosure that is in fluid communication with inlet and outlet manifolds. The inlet manifold may also be in communication with the fuel in the portable fuel container while the outlet manifold may also be attached to a hose or other structure configured to deliver the fuel to another location. As the motor rotates, the impellers move, accelerating fuel outward at a high velocity and discharged to the outlet by centrifugal force to be delivered to the other location. An electric motor is a suitable means for rotating the impellers inside the pump. The motor is also able to generate enough rotational velocity to effectively draw up and dispense the fluid at a sufficient rate.

A small, battery-operated pump needs to be very cost effective, so standard motor platforms and injection molded components are used to meet cost targets for manufacturers. The use of standard shaft end mounted motors in this type of pump requires installing fasteners from the shaft end of the motor to a pump housing. When directly mounted to the pump, seals are required to prevent leakage from the fluid chamber of the pump. These seals are potential leak paths.

SUMMARY

One aspect of the present disclosure includes a compact fluid transfer pump assembly. The compact fluid transfer pump assembly includes a pump enclosure having a pump cavity sized to house a plurality of pump components and an inlet for receiving fluid, a motor enclosure coupled to the pump enclosure having a circular first end spaced by a cylindrical wall having an inner and an outer surface to a circular second end, a motor enclosure cavity formed therebetween within the cylindrical wall, the circular first end having an opening for receiving a motor, the circular second end formed by a bell wall, the motor enclosure removably couplable with a tank and an anti-rotation foot removably coupled with the motor enclosure and extending from the outer surface of the cylindrical wall of the motor enclosure, the anti-rotation foot to assist in coupling the pump assembly with an external fluid reservoir.

Another aspect of the present disclosure includes a method of assembling a compact fluid transfer pump assembly. The method of assembling a compact fluid transfer pump assembly includes the step of providing a pump enclosure having a pump cavity sized to house a plurality of pump components, the pump enclosure having an inlet for receiving fluid and an outlet hose barb having an outlet for the passage of fluid, wherein fluid flows between the inlet and the outlet hose barb along a fluid flow path; providing a motor enclosure coupled to the pump enclosure, the motor enclosure having a circular first end spaced by a cylindrical wall having an inner and an outer surface to a circular second end, forming a motor enclosure cavity therebetween within said cylindrical wall, the circular first end having an opening for receiving a motor, the circular second end formed by a bell wall, the motor enclosure removably couplable with a tank; and providing an anti-rotation foot removably coupled with the motor enclosure and extending from the outer surface of the cylindrical wall of the motor enclosure, the anti-rotation foot having a plurality of elongated channels to assist in coupling the pump assembly with an external fluid reservoir, the anti-rotation foot having an integral connector mount extending from one of the plurality of elongated channels.

Yet another aspect of the present disclosure includes a compact fluid transfer pump assembly. The compact fluid transfer pump assembly includes a pump enclosure having a pump cavity sized to house a plurality of pump components and an inlet for receiving fluid. The compact fluid transfer pump assembly also includes a motor enclosure coupled to the pump enclosure, the motor enclosure having a circular first end spaced by a cylindrical wall having an inner and an outer surface to a circular second end, a motor enclosure cavity formed therebetween within the cylindrical wall, the circular first end having an opening for receiving a motor, the circular second end formed by a bell wall, the motor enclosure removably couplable with a tank, an anti-rotation foot removably coupled with the motor enclosure and extending from the outer surface of the cylindrical wall of the motor enclosure, the anti-rotation foot having a plurality of elongated channels to assist in coupling said pump assembly with a fluid reservoir. The assembly also includes a motor carrier plate removably coupled with the anti-rotation foot and the motor enclosure forming a seated arrangement with a motor carrier plate seat formed within the inner surface of the cylindrical wall of the motor enclosure and a wiring joint formed within the bell wall of the motor enclosure, the wiring joint having first and second wire strain reliefs.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

Figure 1:
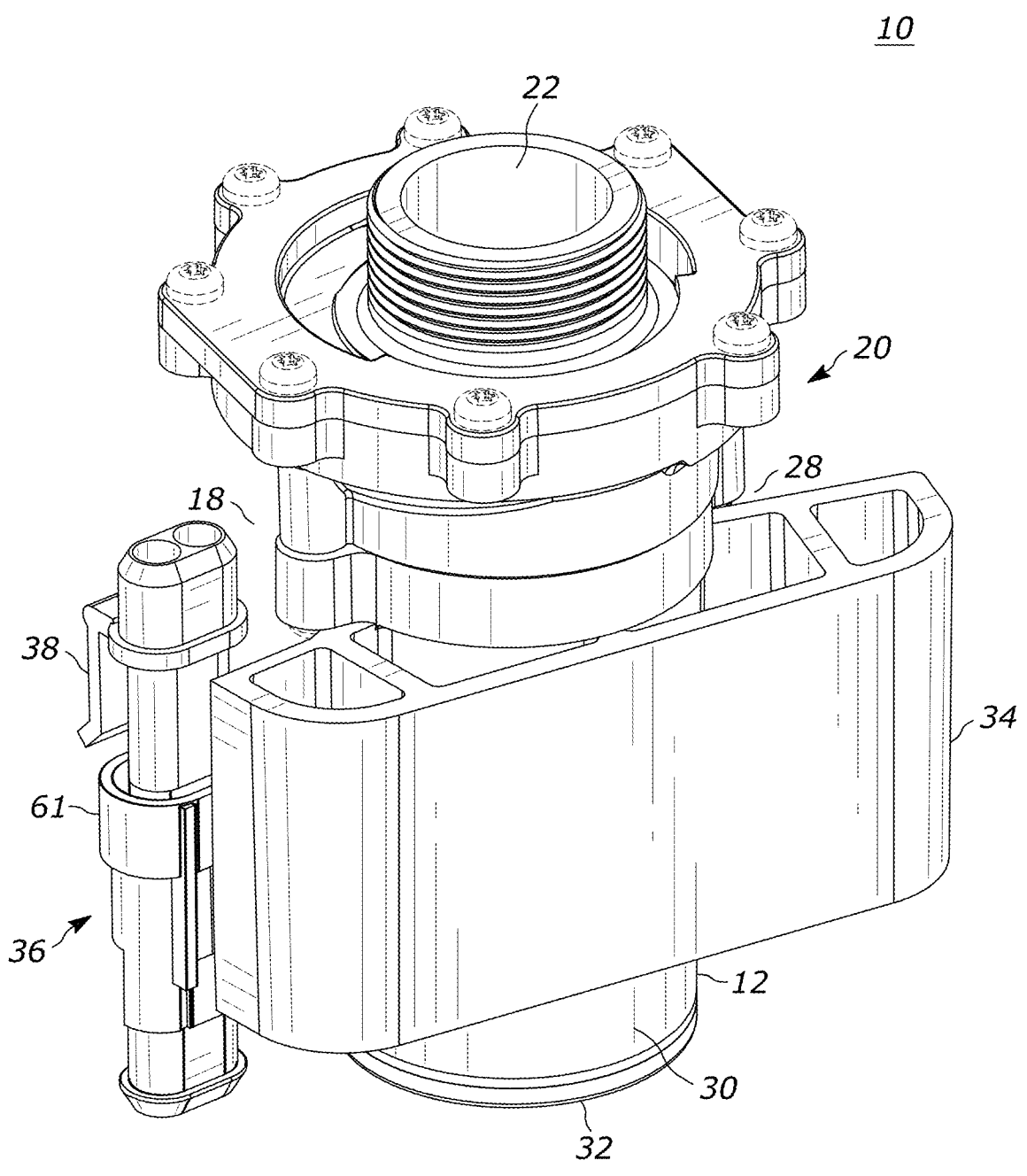
FIG. 1 is an upper rear left perspective view of a compact fluid transfer pump assembly in accordance with one illustrated example embodiment of the present disclosure.
Figure 2:
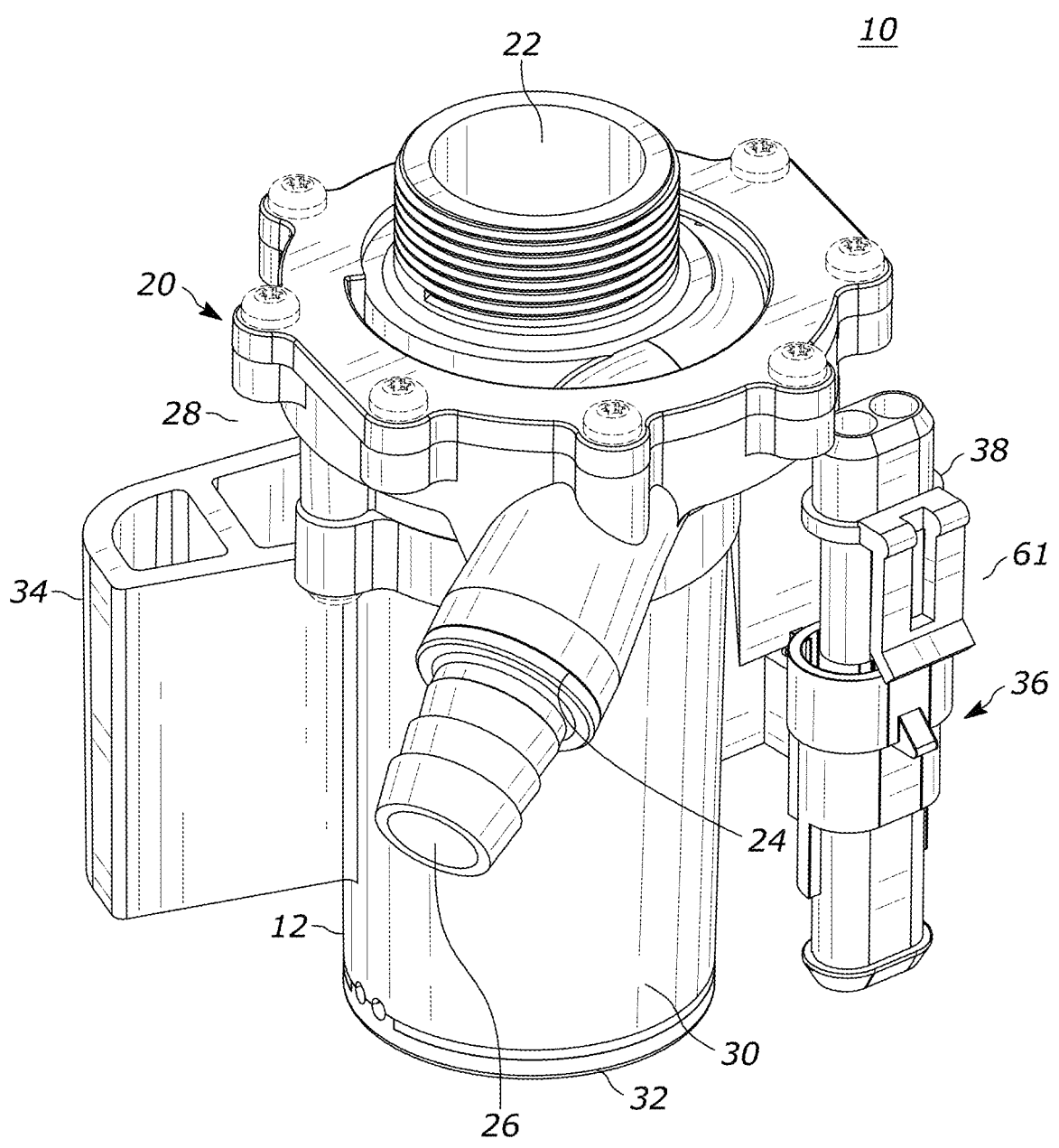
FIG. 2 is an upper front left perspective view, with an upper rear right perspective view being a mirror image thereof.
Figure 3:
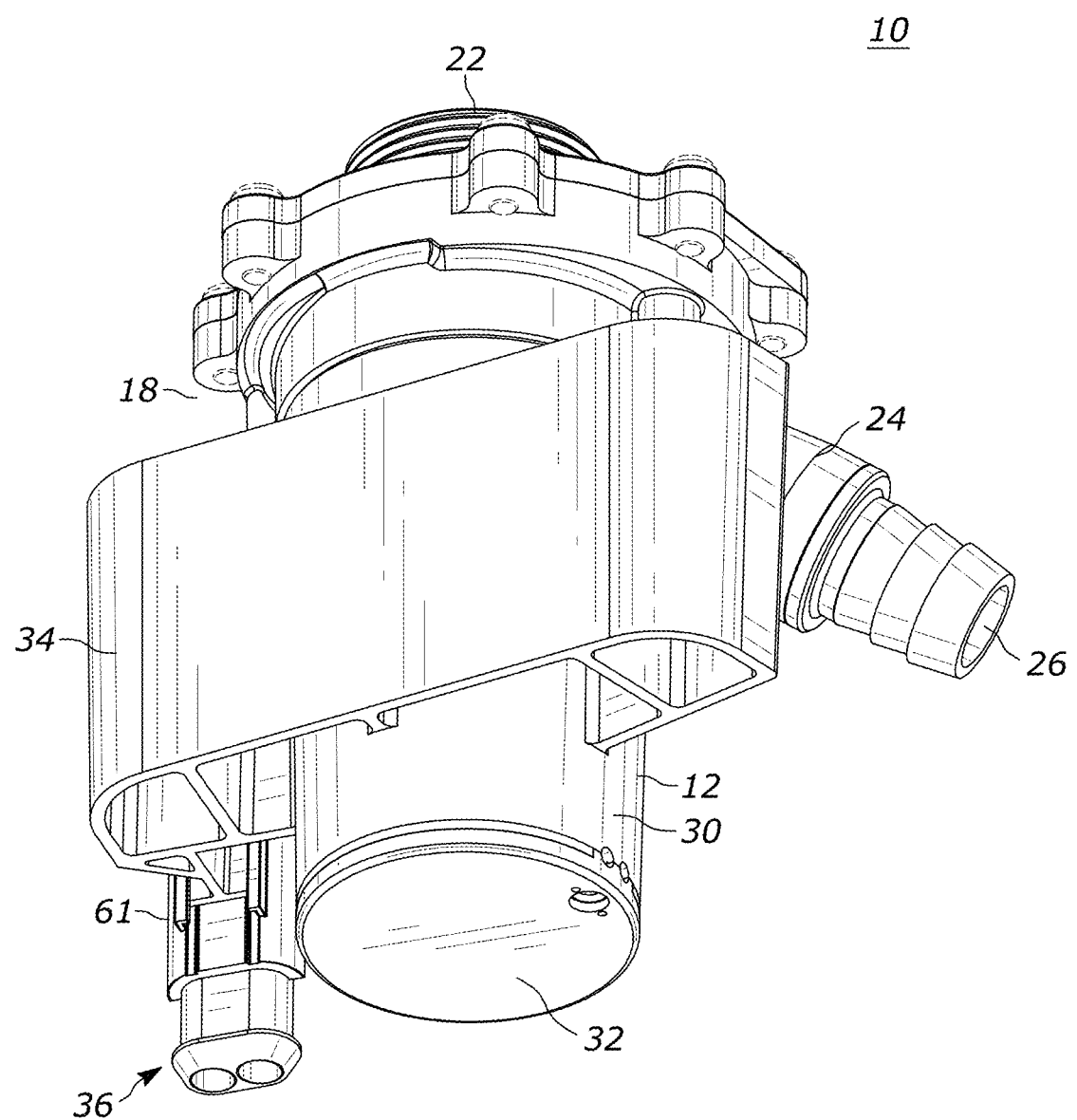
FIG. 3 is a lower rear right perspective view, with a lower front right perspective view being a mirror image thereof.
Figure 4:
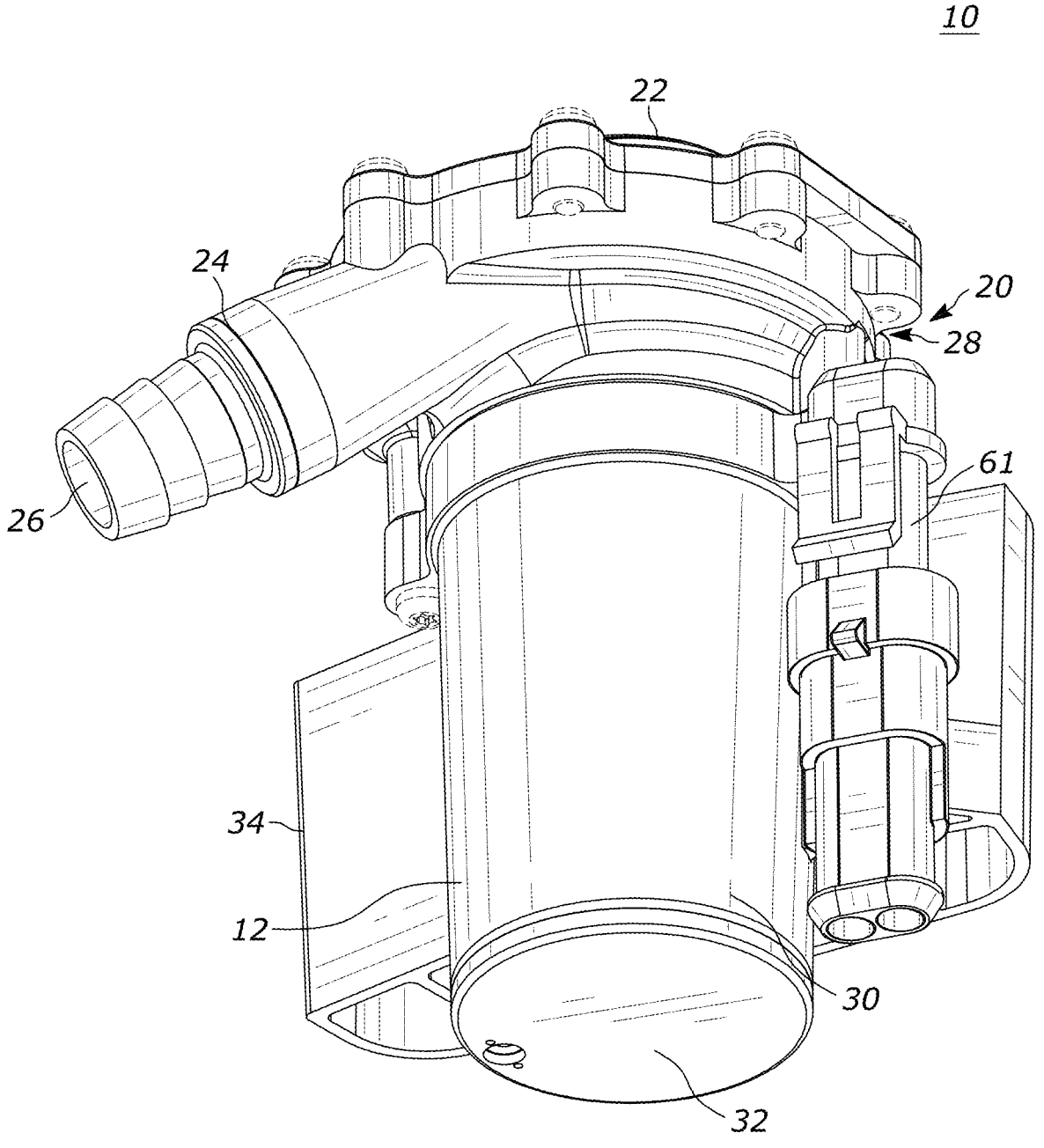
FIG. 4 is a lower front left perspective view, with a lower rear right perspective view being a mirror image thereof.
Figure 5:
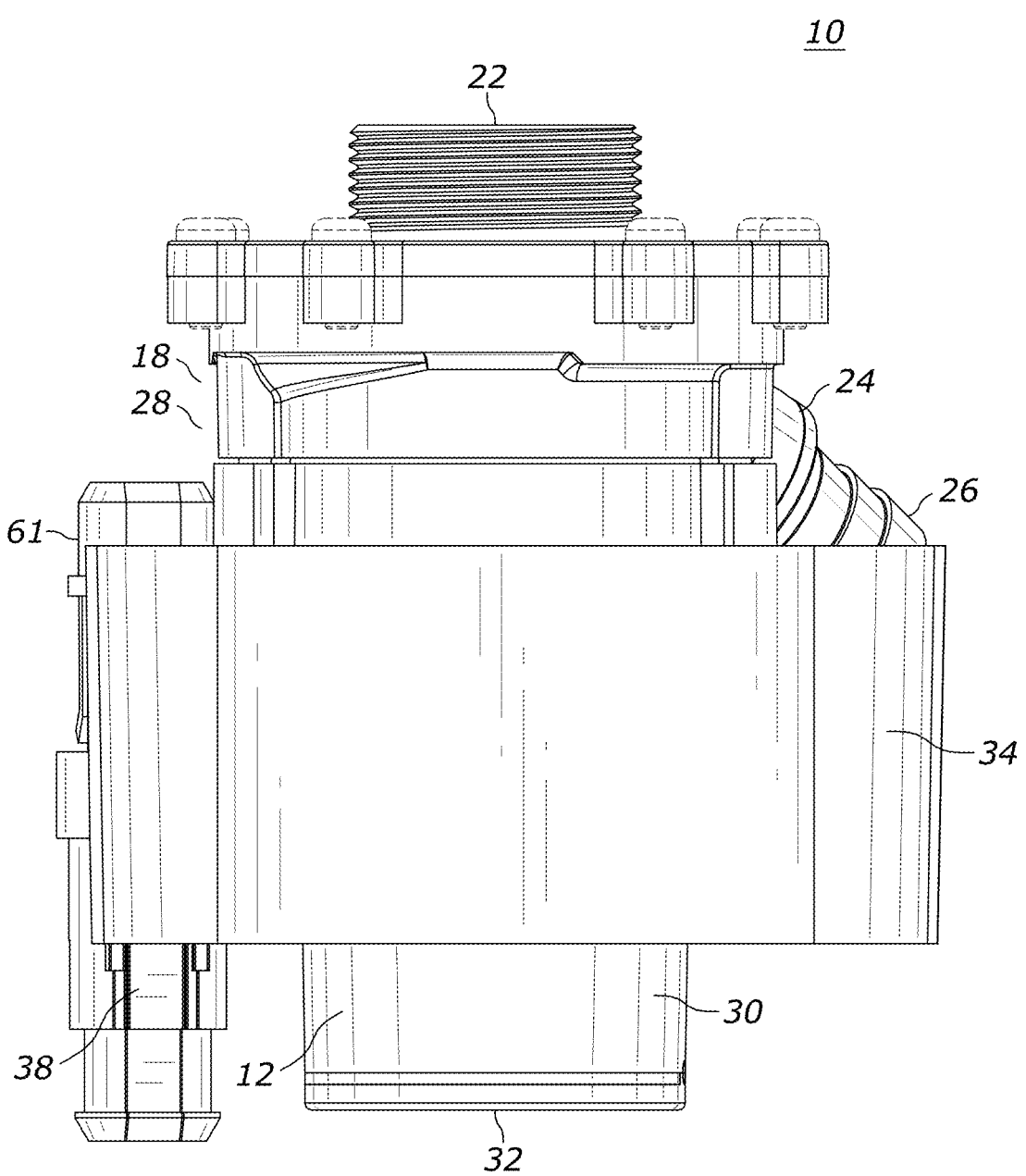
FIG. 5 is a rear elevation view thereof.
Figure 6:
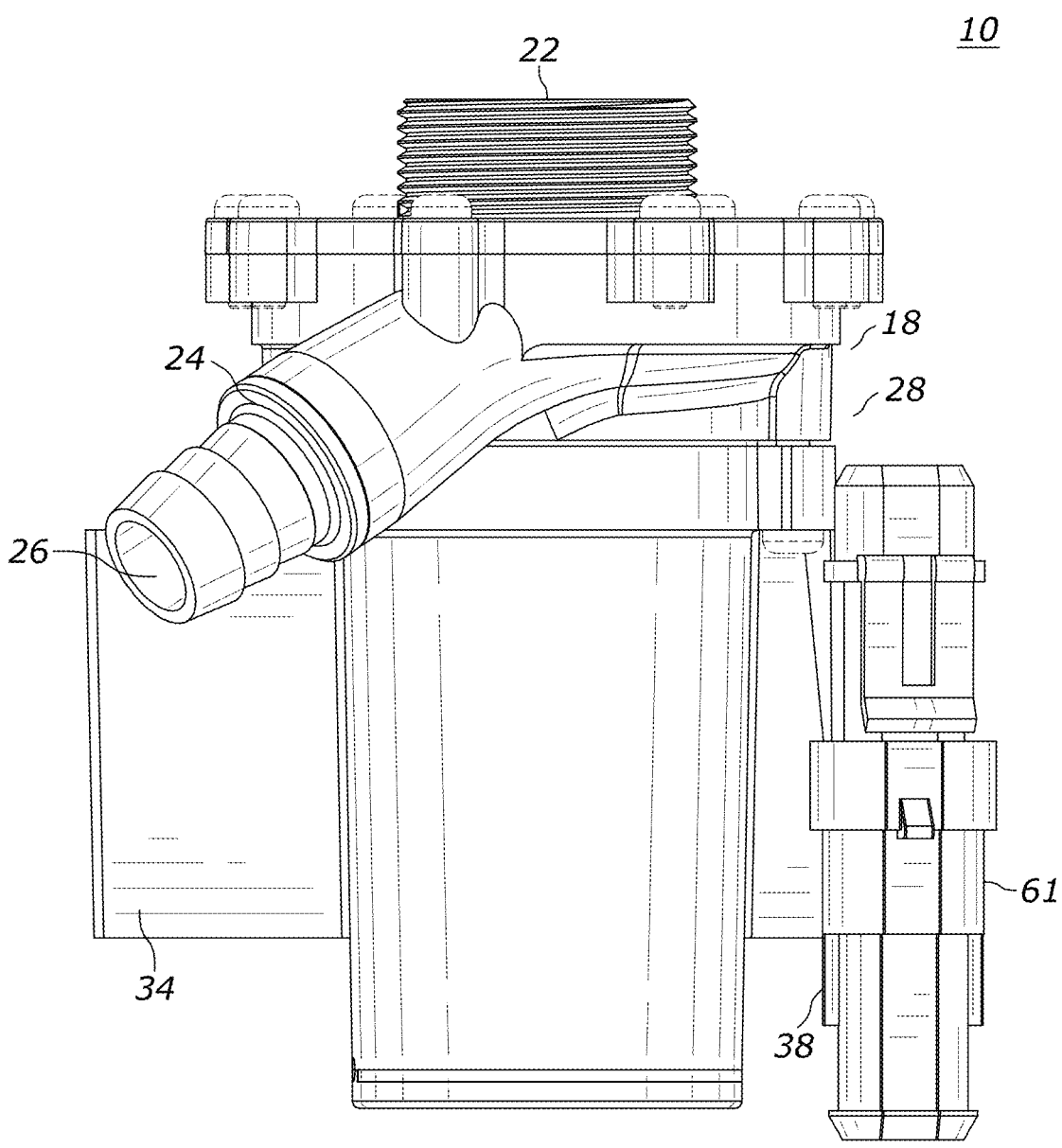
FIG. 6 is a front elevation view thereof.
Figure 7:
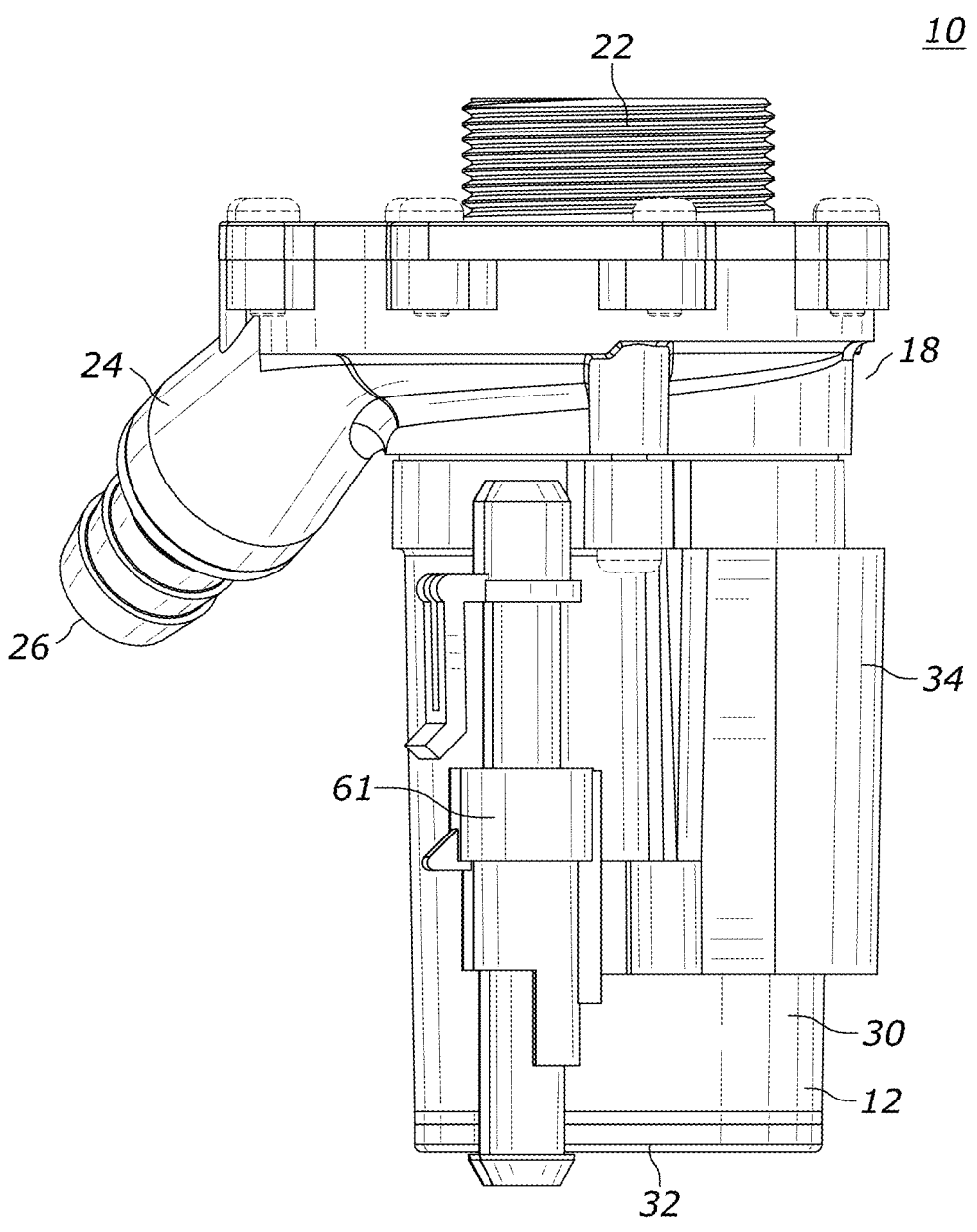
FIG. 7 is a right-side view thereof.
Figure 8:
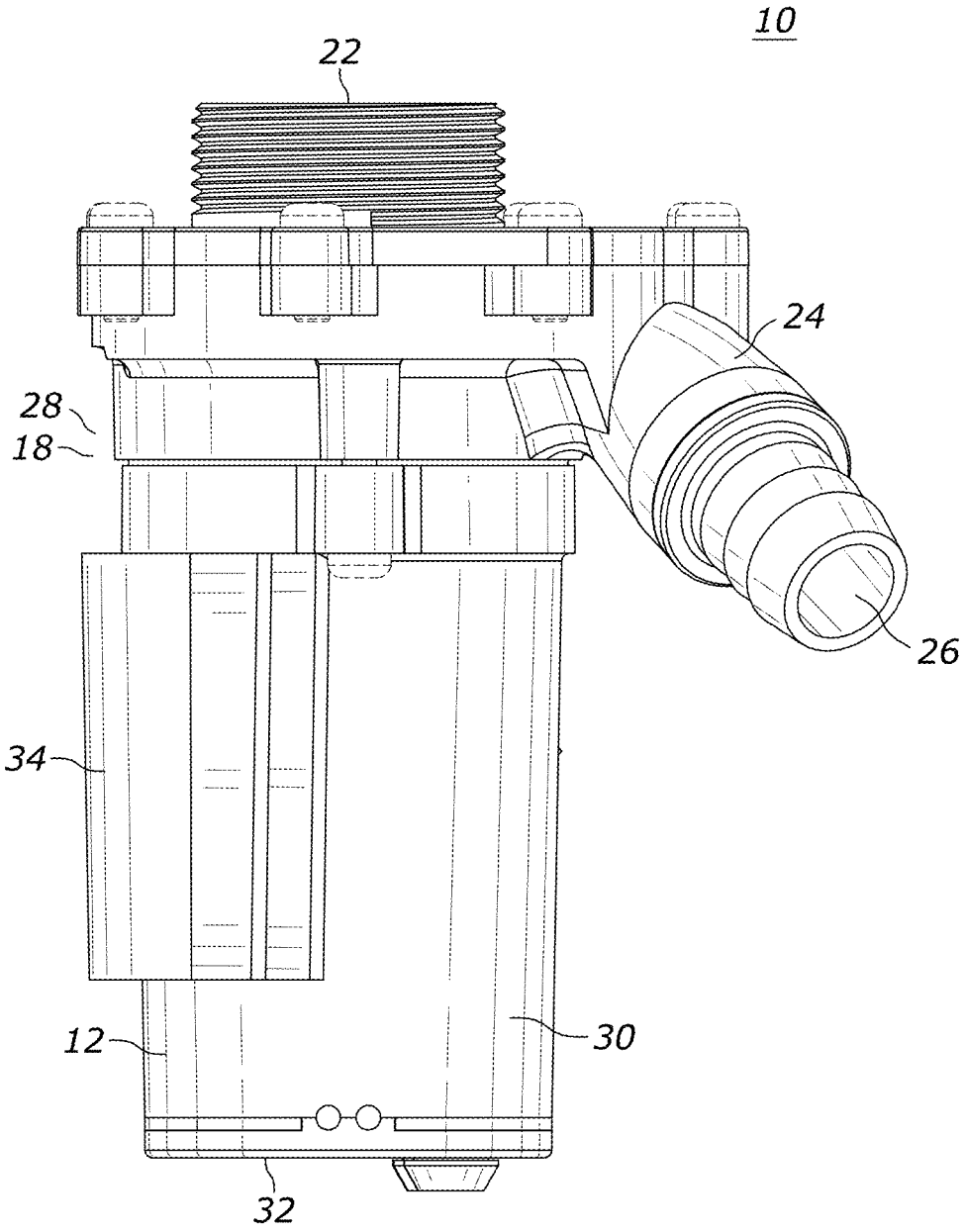
FIG. 8 is a left-side view thereof.
Figure 9:
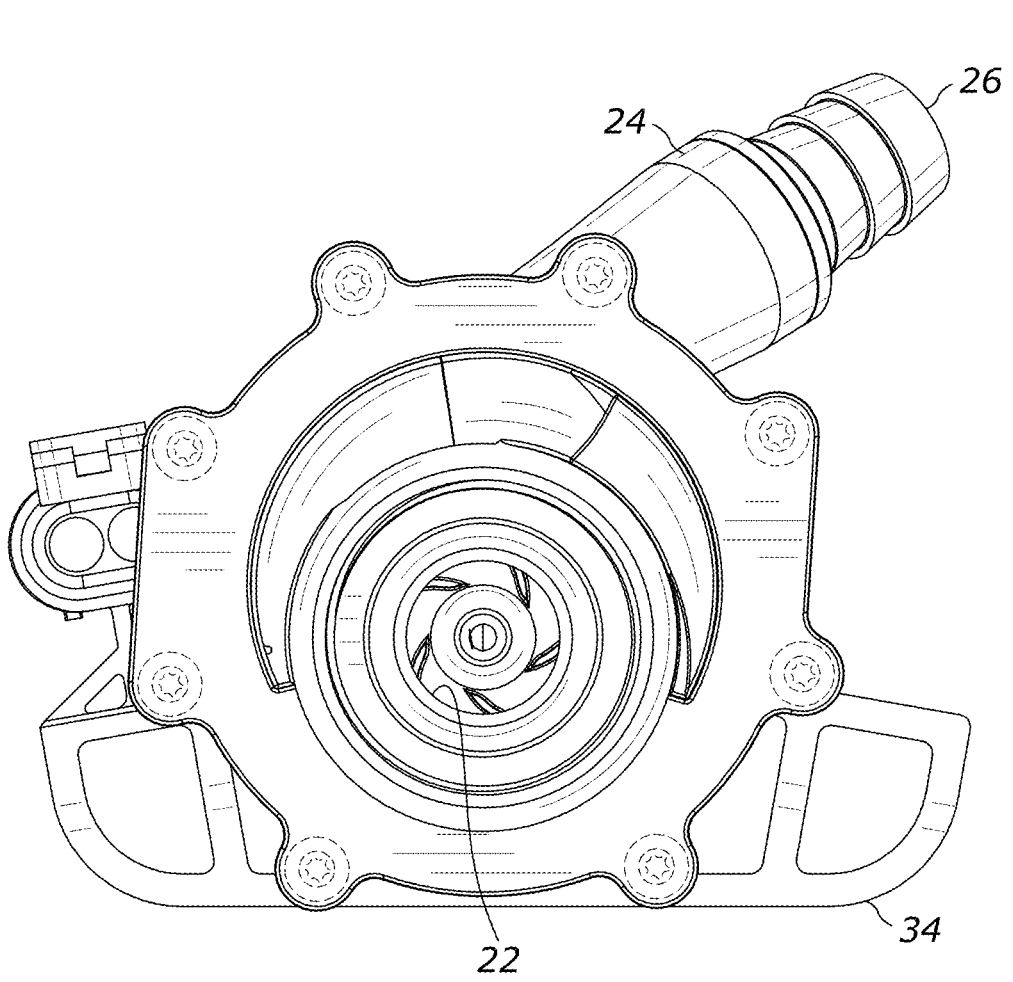
FIG. 9 is a top plan view thereof.
Figure 10:
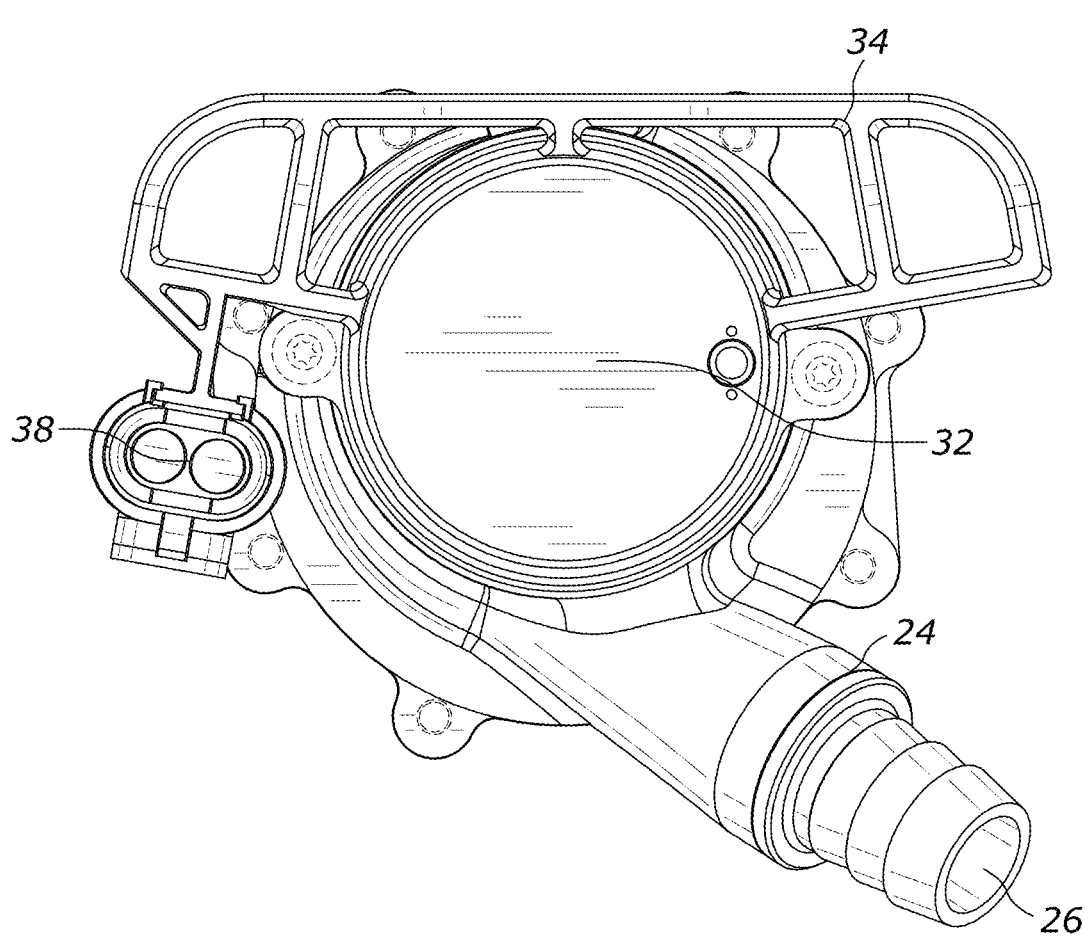
FIG. 10 is a bottom plan view thereof.
Figure 11:
FIG. 11 is a top plan view thereof.
Figure 12:
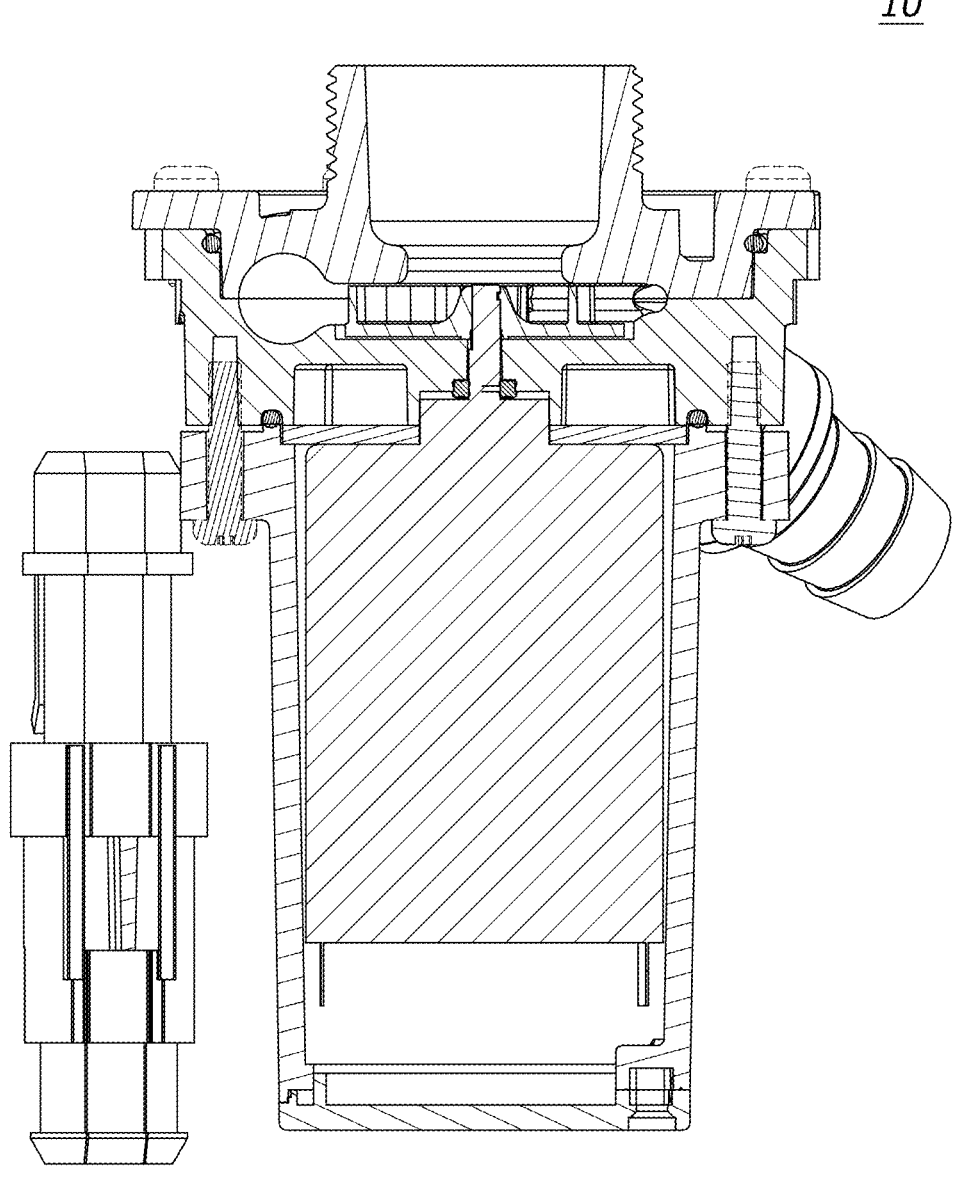
FIG. 12 is a section view of FIG. 11 along section lines 12-12 thereof.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure. Further, the utility and purpose of many structures are shown in the figures are described throughout the specification. However, it should be appreciated that some of the structures shown in the figures have been selected or invented for aesthetic appearance and ornamental design independent of its utilitarian operation or lack thereof.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures wherein like numbered features shown therein refer to like elements throughout unless otherwise noted. The present disclosure relates generally to a compact fluid transfer pump assembly and method, and more particularly, a compact fluid transfer pump assembly having a motor shroud with an anti-rotation foot.

FIGS. 1-18, 22, 22A, 23, and 23A illustrate multiple views of a compact fluid transfer pump assembly 10 in accordance with one example embodiment of the present disclosure. The compact fluid transfer pump assembly 10 comprises an assembly housing 28, a pump housing 20, a motor enclosure 30, and a motor 12 that is powered by a cordless power source (not shown). In one example embodiment of the present disclosure, the cordless power or stand-alone source comprises a battery. One of ordinary skill in the art, after reviewing the present disclosure, would understand that the power source could be in contact with the motor enclosure 30 or remotely located and coupled by power lines.

Figure 28:
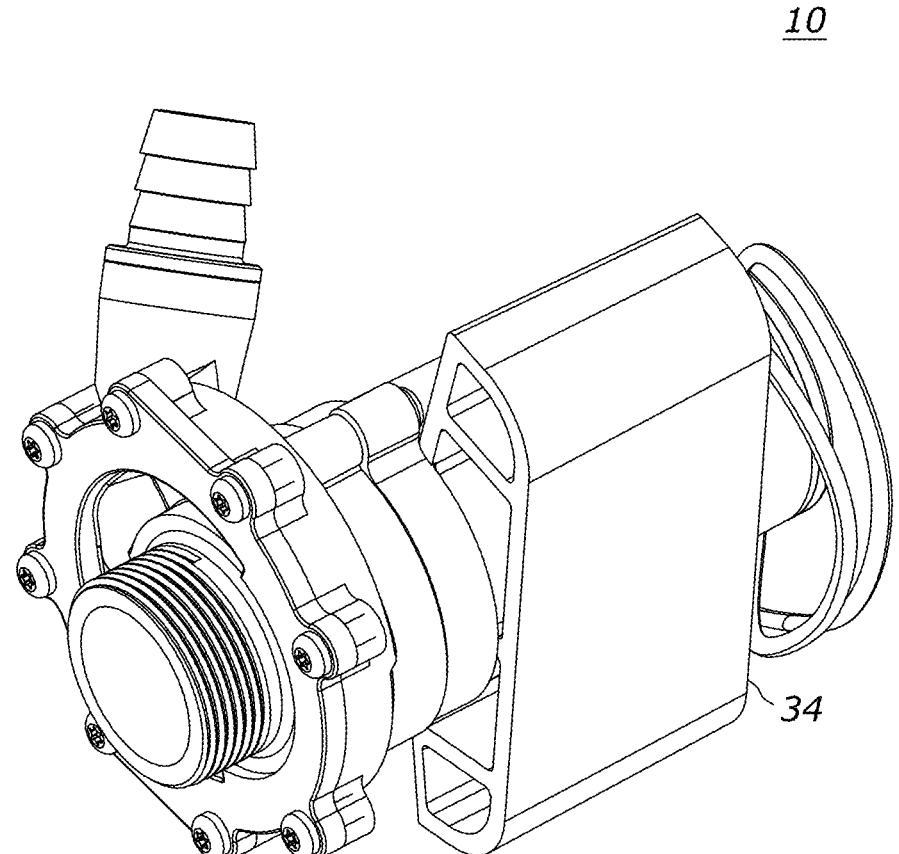
FIG. 28 shows a tank alignment feature of a compact fluid transfer pump assembly according to one example embodiment of the present disclosure.

An assembly housing 28 of the compact fluid transfer pump 10 is formed by the pump housing 20, the motor shroud or enclosure 30, and motor shroud end cap 32. The motor shroud 30 includes multiple features that provide substantial improvement over a traditional motor shroud. One such feature is a foot mount 34 to the shroud 30, featured in FIG. 28. The foot 34 provides multiple advantages; one advantage is to provide ease in pre-aligning the pump to an operation orientation during the assembly process with a corresponding tank (not shown). The second function is to serve as a deflection limiter during rough handling when used with a tank with a corresponding recess. The foot mount 34 may comprise a polymer material and be constructed via injection molding techniques.

Figure 23:
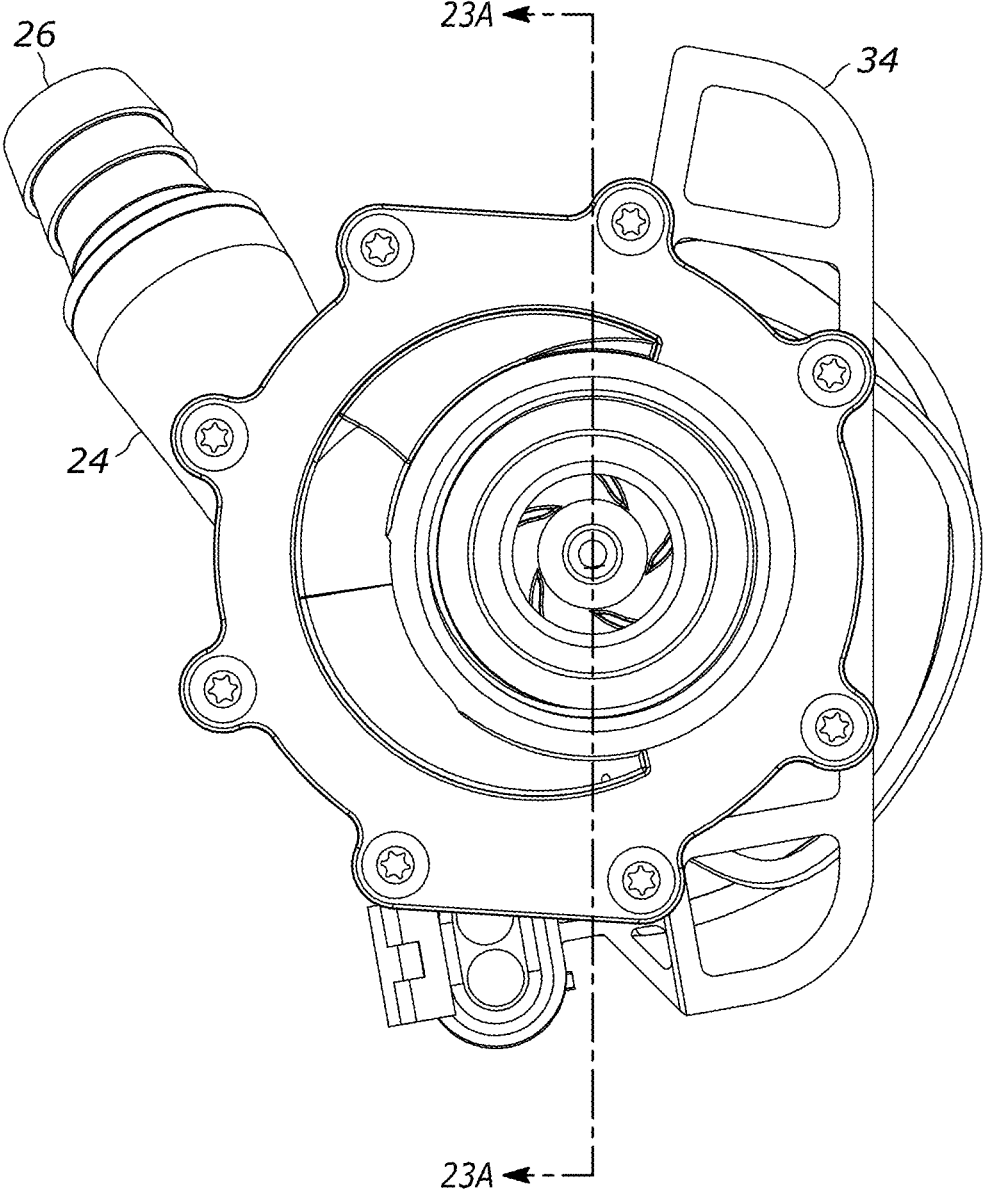
FIG. 23 illustrates a top plan view of a compact fluid transfer pump assembly in accordance with one example embodiment of the present disclosure.

As shown in FIG. 23, the foot 34 is formed by elongated hollow channels that are arranged in an offset or non-symmetric hole pattern to provide maximum clearance with a coupled tank (not shown). The elongated hollow channels of the foot 34 provide stability while keeping the foot mount 34 lightweight enough for a user to hold, and lightweight enough for the assembly 10 to support. The foot mount 34 is formed via injection molding as part of the motor enclosure or shroud 30 with a plurality of feet extending from the foot 34 that rest on the outer periphery of the motor shroud to further increase stability.

Figure 18:
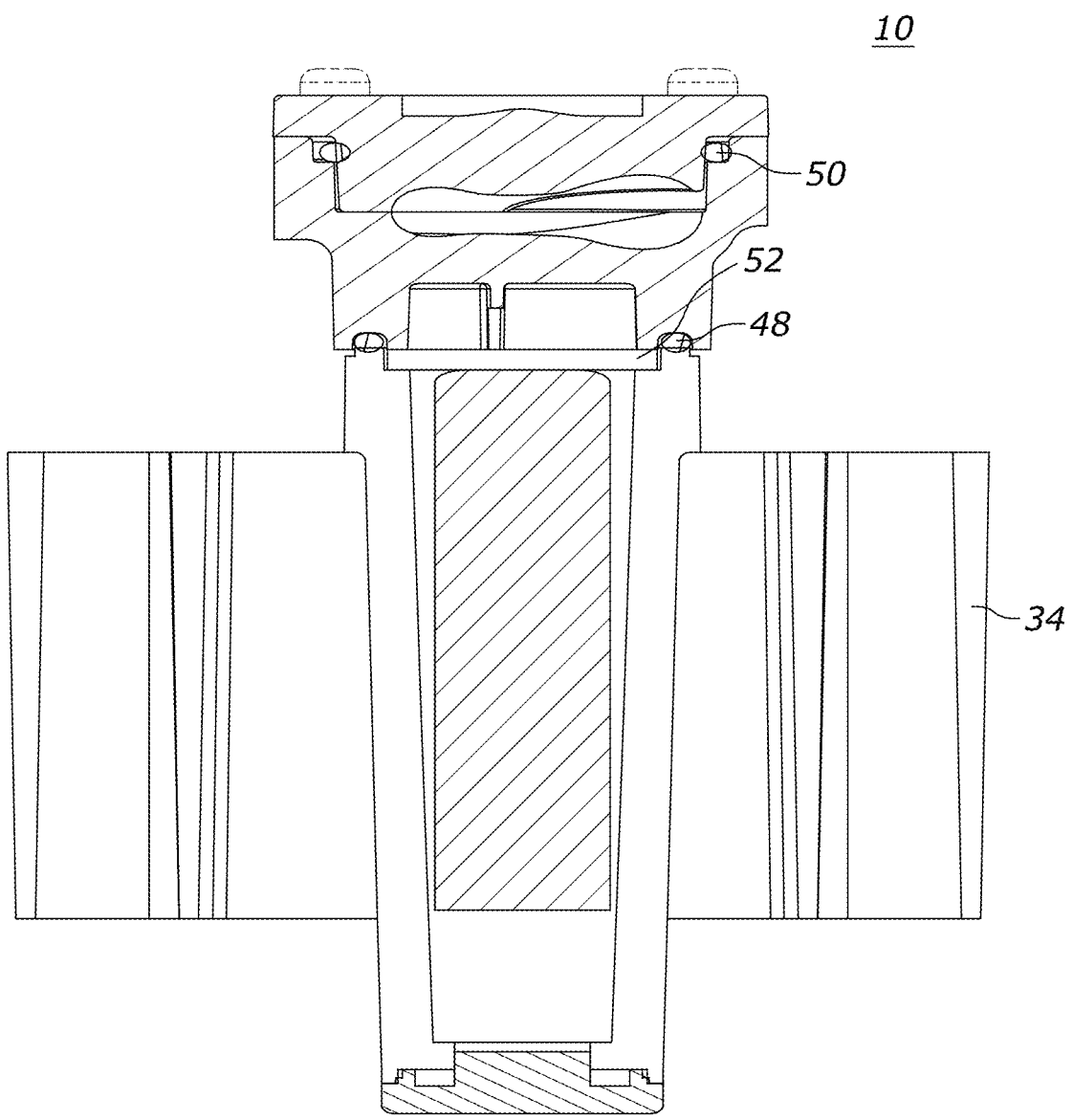
FIG. 18 is a section view of FIG. 11 along section lines 18-18 thereof.
Figure 19:
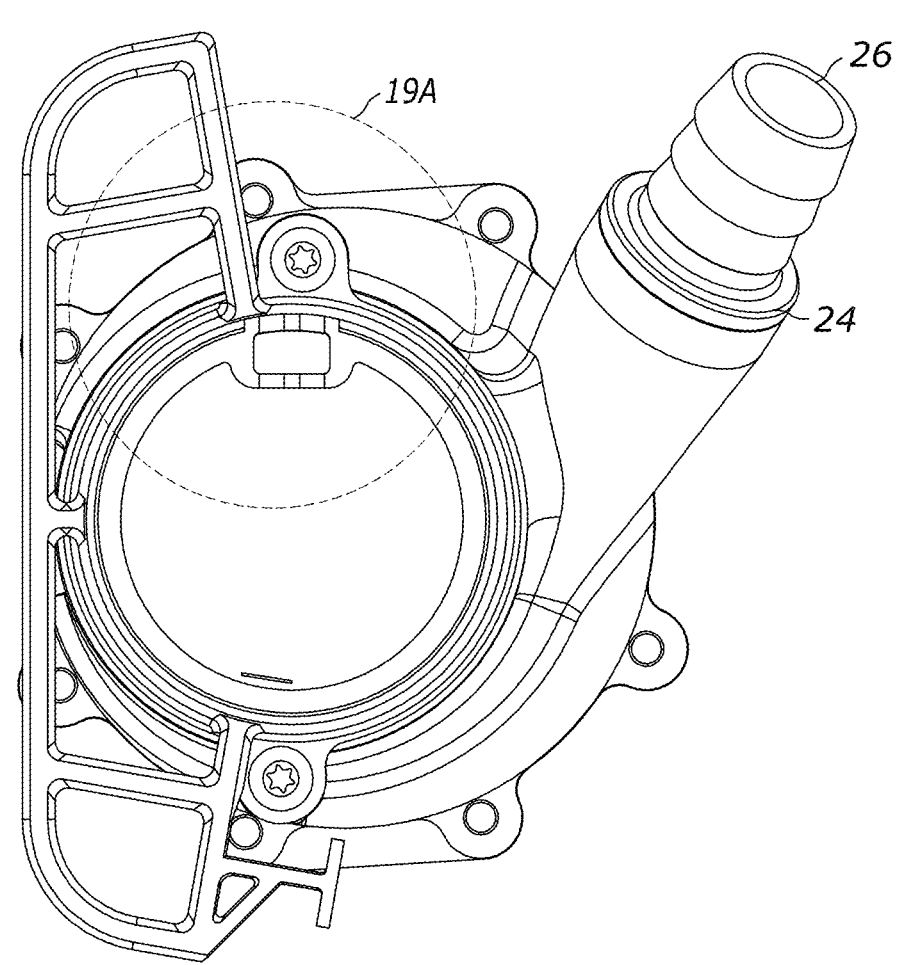
FIG. 19 illustrates a compact fluid transfer pump assembly having a double wiring joint in accordance with one illustrated example embodiment of the present disclosure.
Figure 19A:
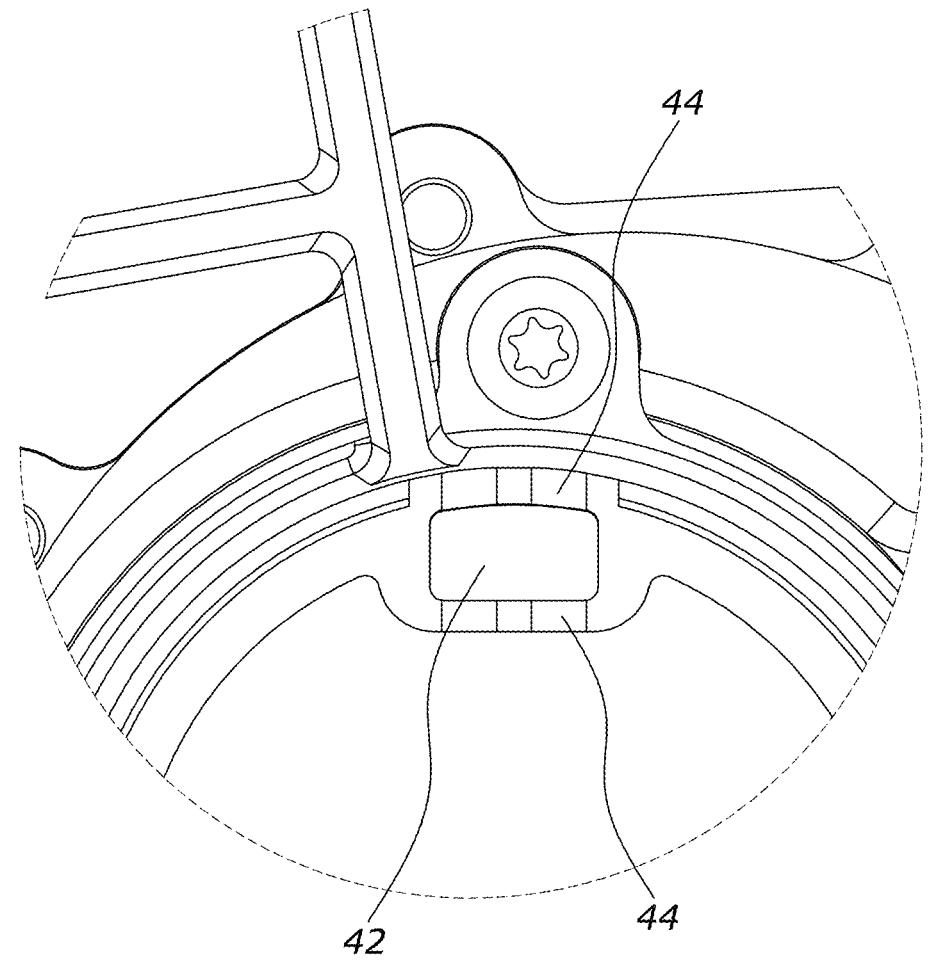
FIG. 19A is a magnified view of the portion of FIG. 19 indicated in the circle 19A.
Figure 20:
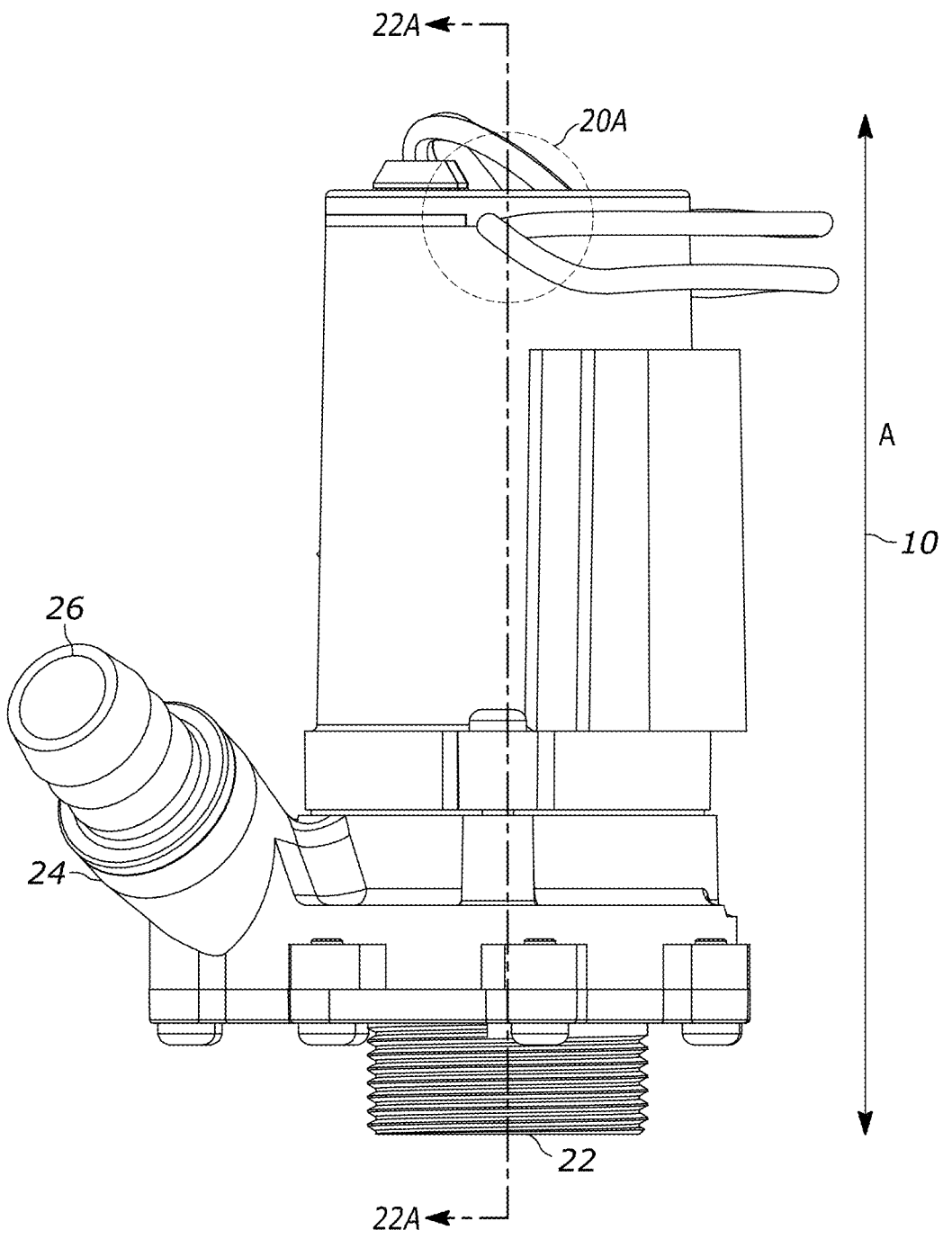
FIG. 20 illustrates a compact fluid transfer pump assembly in accordance with one illustrated example embodiment of the present disclosure.
Figure 20A:
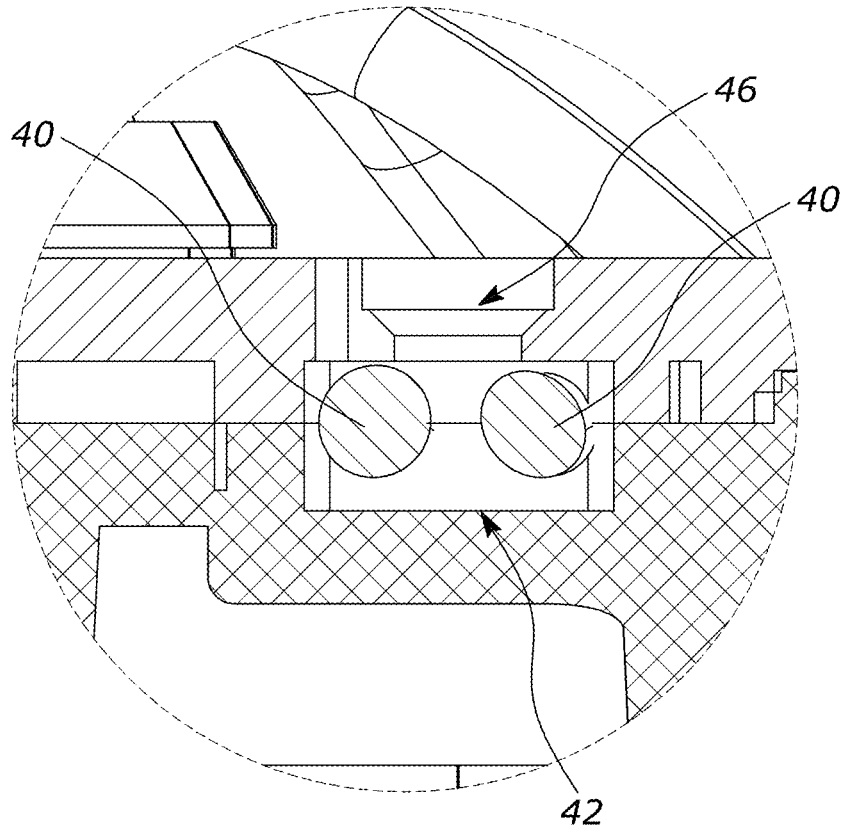
FIG. 20A is a cross-sectional view of a compact fluid transfer pump assembly along section line 22A-22A of FIG. 20 magnifying a portion of the compact fluid transfer pump assembly showing a potting cavity in accordance with one illustrated example embodiment of the present disclosure.
Figure 21:
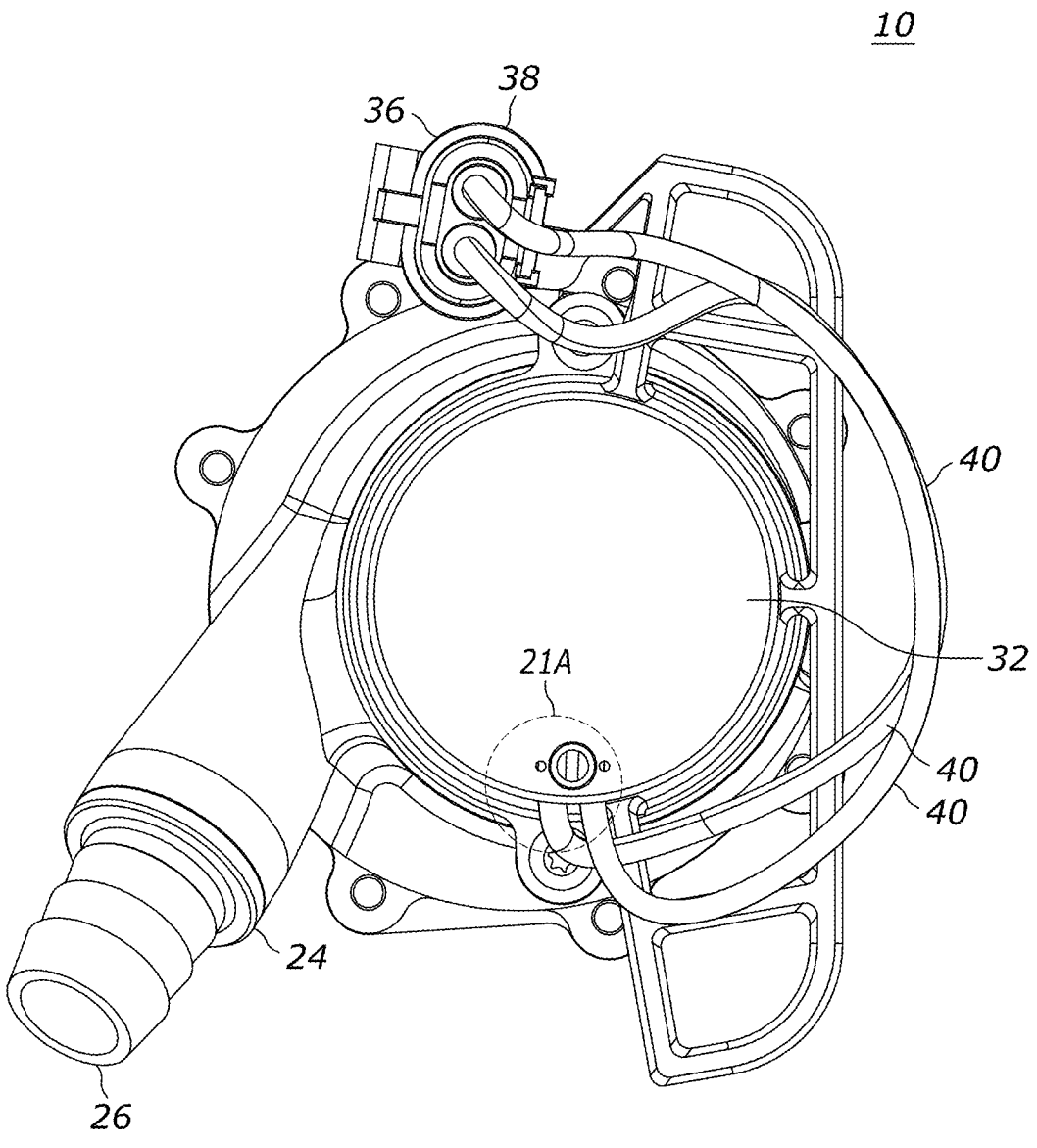
FIG. 21 is a bottom plan view of a compact fluid transfer pump assembly showing a potting cavity fill port in accordance with one illustrated example embodiment of the present disclosure.
Figure 21A:
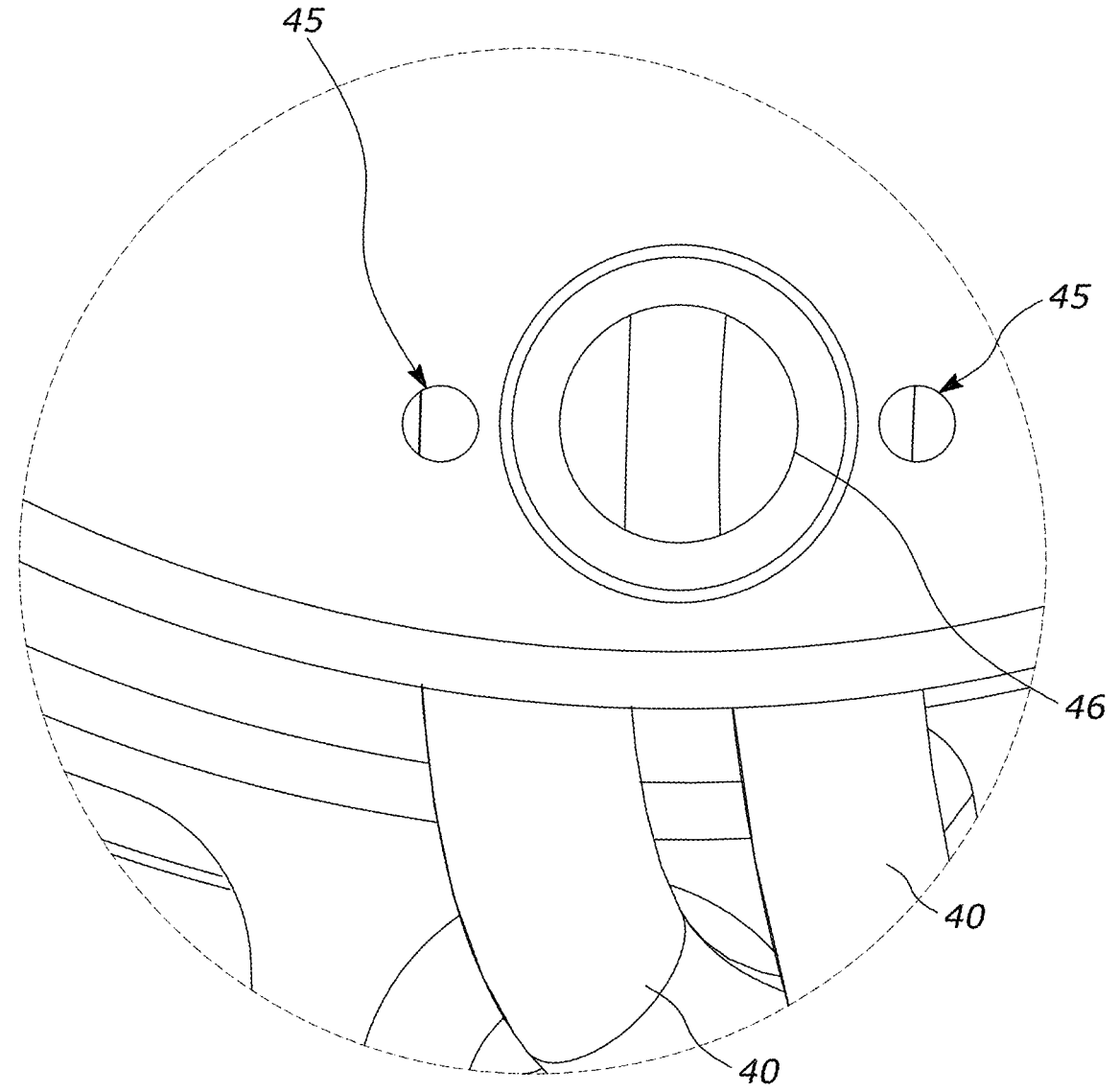
FIG. 21A is a magnified view of the portion of FIG. 21 indicated in the circle.
Figure 22:
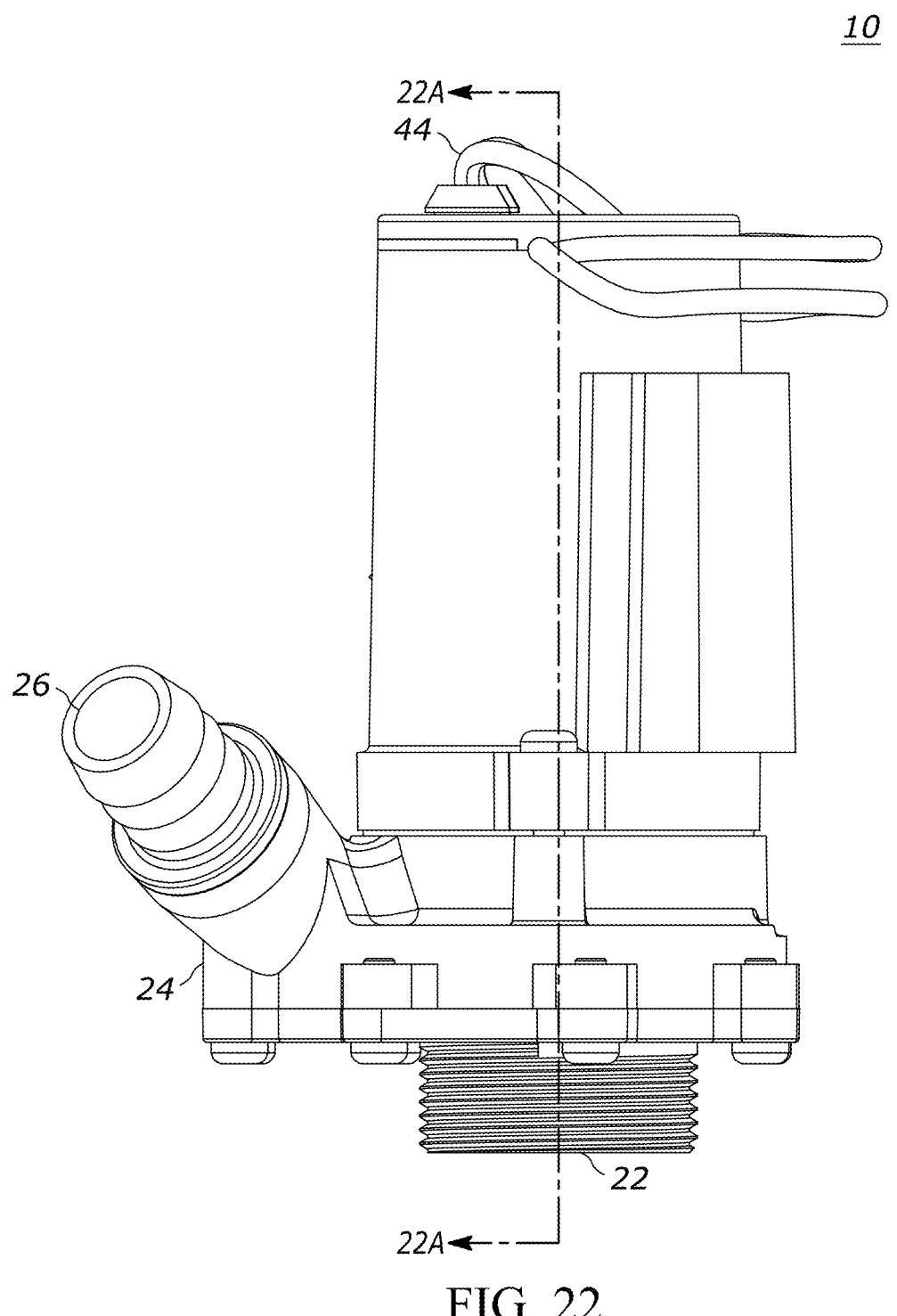
FIG. 22 illustrates a side view of a compact fluid transfer pump assembly in accordance with one example embodiment of the present disclosure.
Figure 22A:
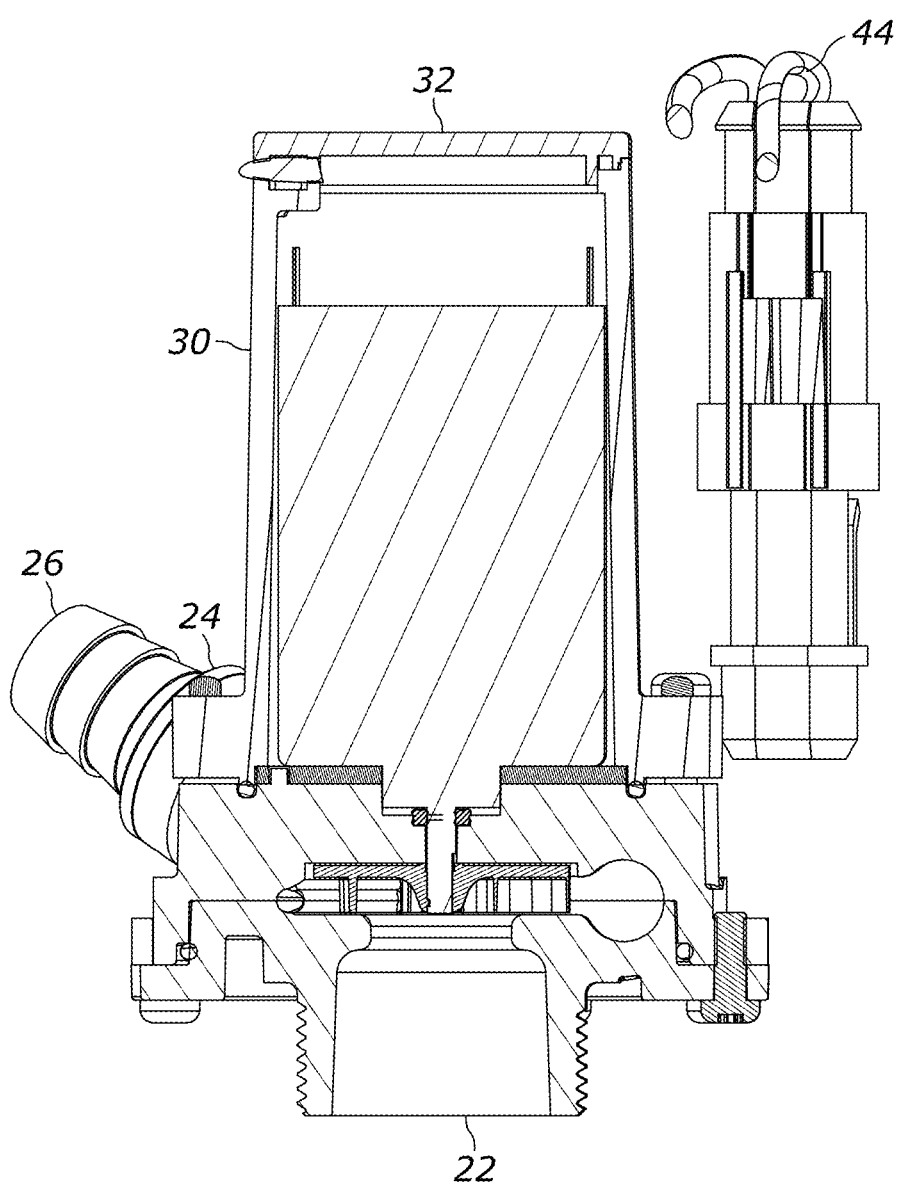
FIG. 22A is a cross-sectional view of a compact fluid transfer pump assembly along section line 22A-22A of FIG. 22 in accordance with one illustrated example embodiment of the present disclosure.

FIG. 21 shows the motor enclosure 30 and wiring joint arrangement 36 which is sealed to eliminate precipitation from entering the wiring joint arrangement 36. This sealing of traditional wires is traditionally accomplished through a combination of fasteners and elastomeric seals or using sealing or potting materials. The traditional wiring assembly significantly increases the number of components and labor costs to assemble. In the present disclosure, the wiring joint arrangement 36 is a module that attaches to motor 12 by ultrasonic welding in combination with sealing or potting compounds creates a double strain relieved wire joint arrangement 36, which maximizes the physical durability of a wire connection point 38 where wires 40 pass between the motor shroud 30 and the motor shroud cap 32 while creating a sealed joint arrangement 36 with minimal exposure of the sealing/potting material, while vent holes 45 allow for the release of air when potting. A potting cavity 42 is located between wires 40 and is filled via a port 46 in the motor shroud cap 32 (see FIGS. 19, 19A, 20, 20A, 21, and 21A). FIG. 18 shows motor shroud, pump housing, and shaft seals 48, 50, 52 which further protect the rest of the pump assembly 10 from any precipitation. In one example embodiment, shaft seals 48 and 50 comprise O-ring seals (see FIGS. 17 and 18). The O-ring seal 48 seals the motor itself off from any potential precipitation.

Figure 26:
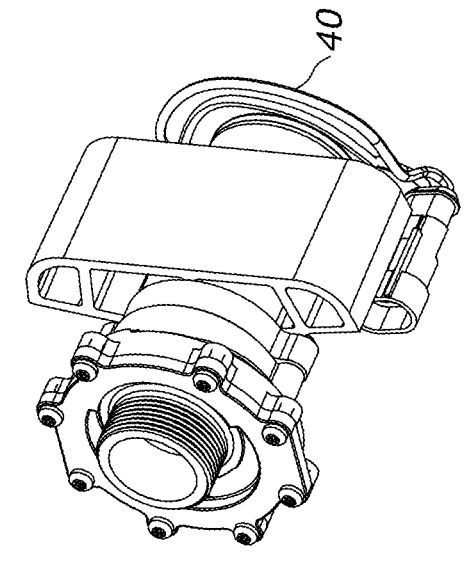
FIG. 26 shows the pairing of a compact fluid transfer pump assembly having an integral connector mounting point paired with an off-the-shelf connector in accordance with one illustrated example embodiment of the present disclosure.
Figure 26:
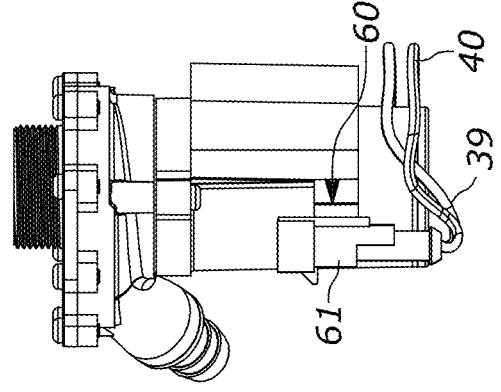
Figure 26:
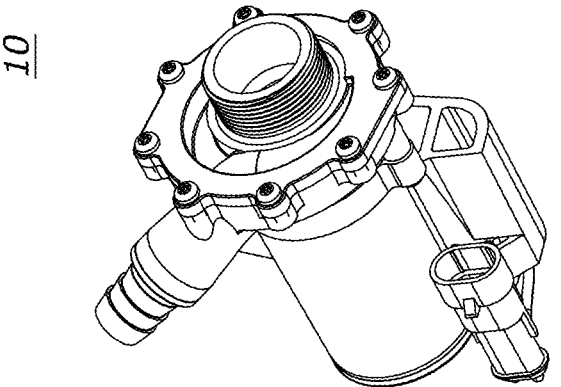

One version of the motor shroud cap 32 features a wire constraint feature 39, shown in FIG. 26. In another example embodiment, the wires 40 are coupled closer to the motor shroud 30 than what is shown in FIG. 26 and a hook and/or L-shaped fixture constrains the wires 40 from extending further from the motor shroud 30 than desired by the manufacturer.

Figure 13:
FIG. 13 is a section view of FIG. 11 along section lines 13-13 thereof.
Figure 13:
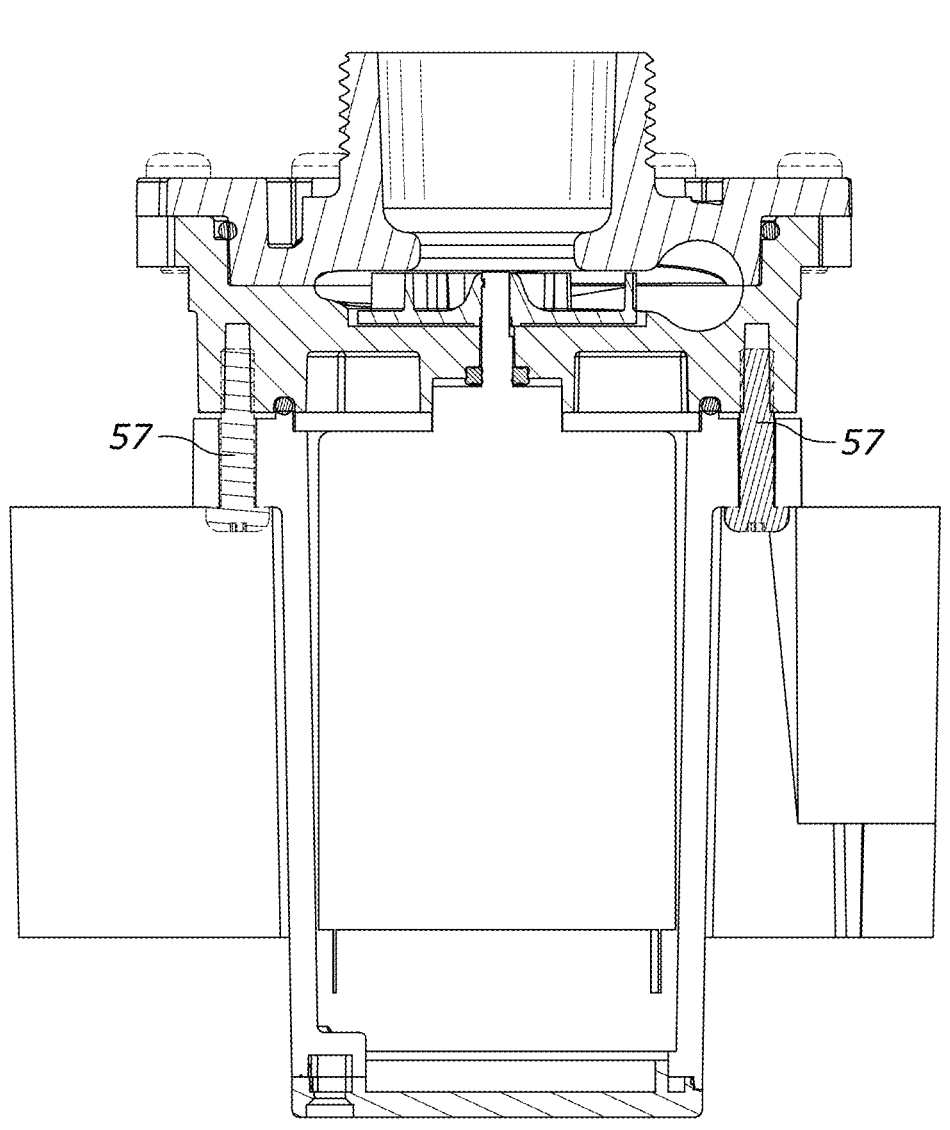
Figure 14:
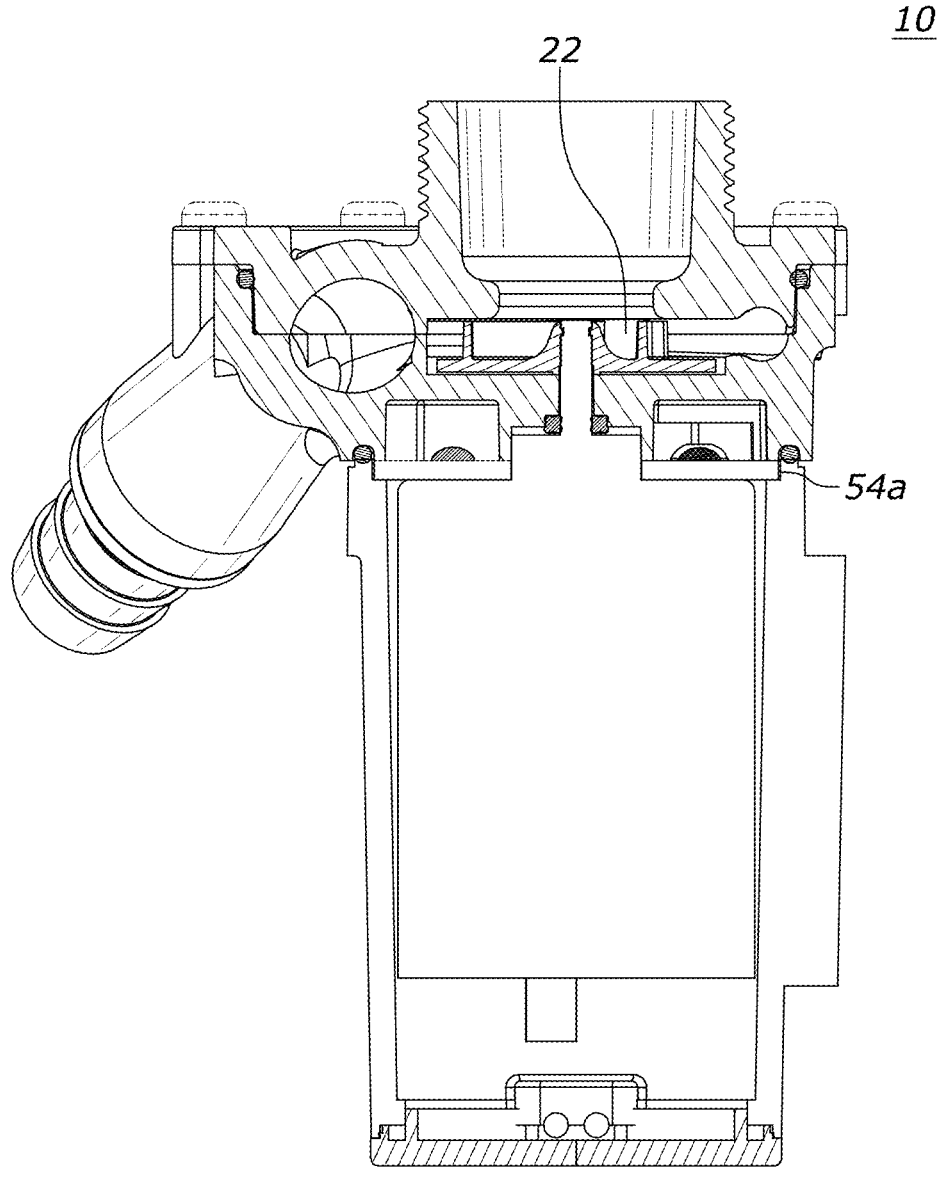
FIG. 14 is a section view of FIG. 11 along section lines 14-14 thereof.
Figure 15:
FIG. 15 is a section view of FIG. 11 along section lines 15-15 thereof.
Figure 15:
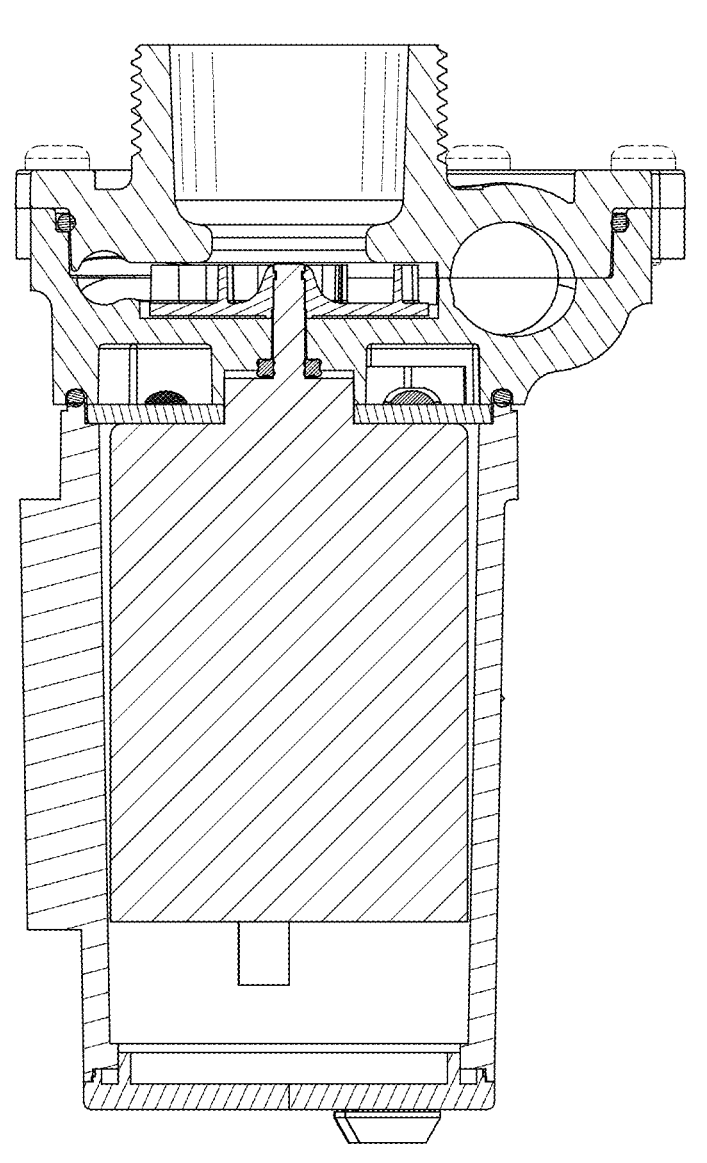
Figure 16:
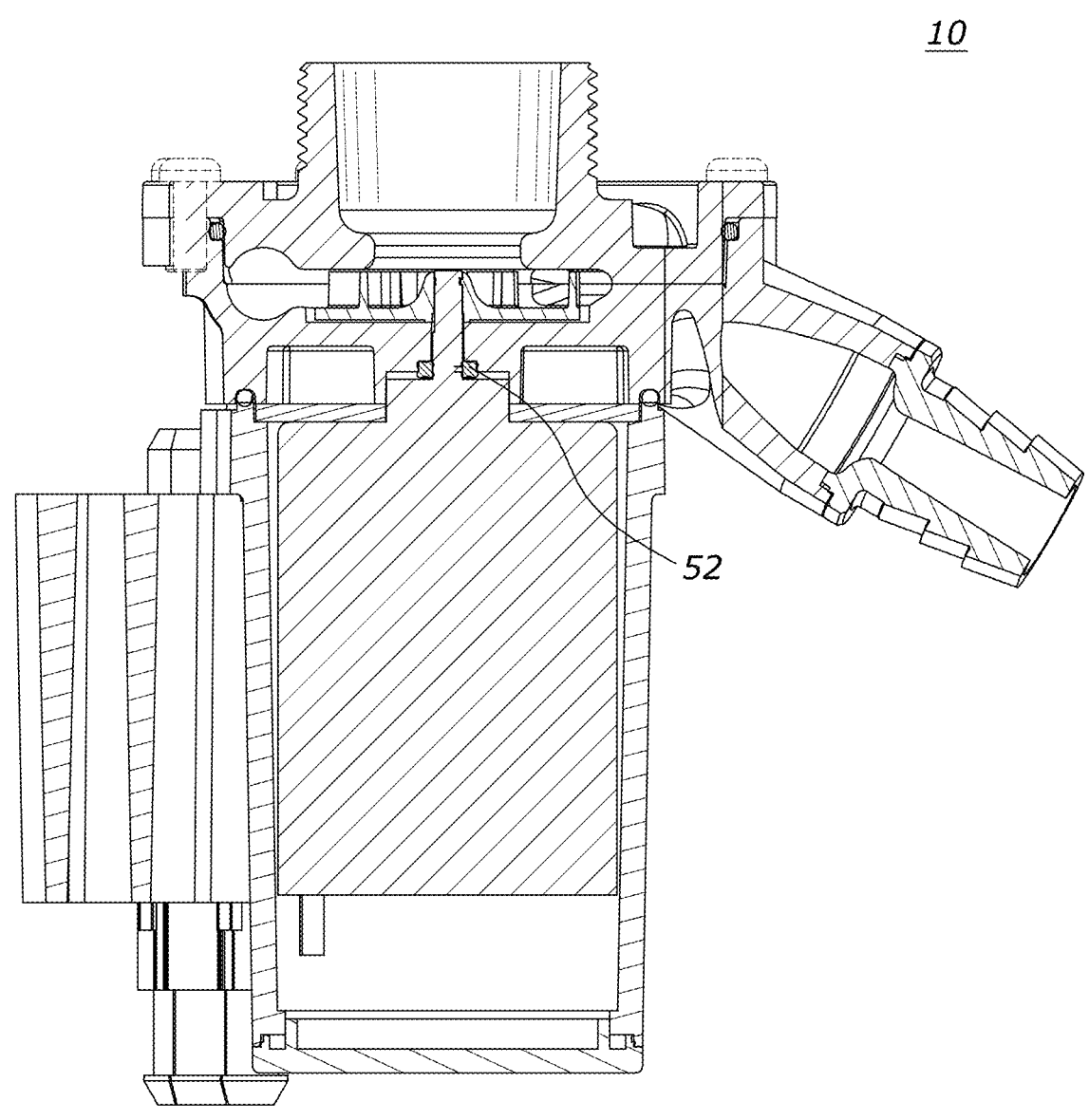
FIG. 16 is a section view of FIG. 11 along section lines 16-16 thereof.
Figure 17:
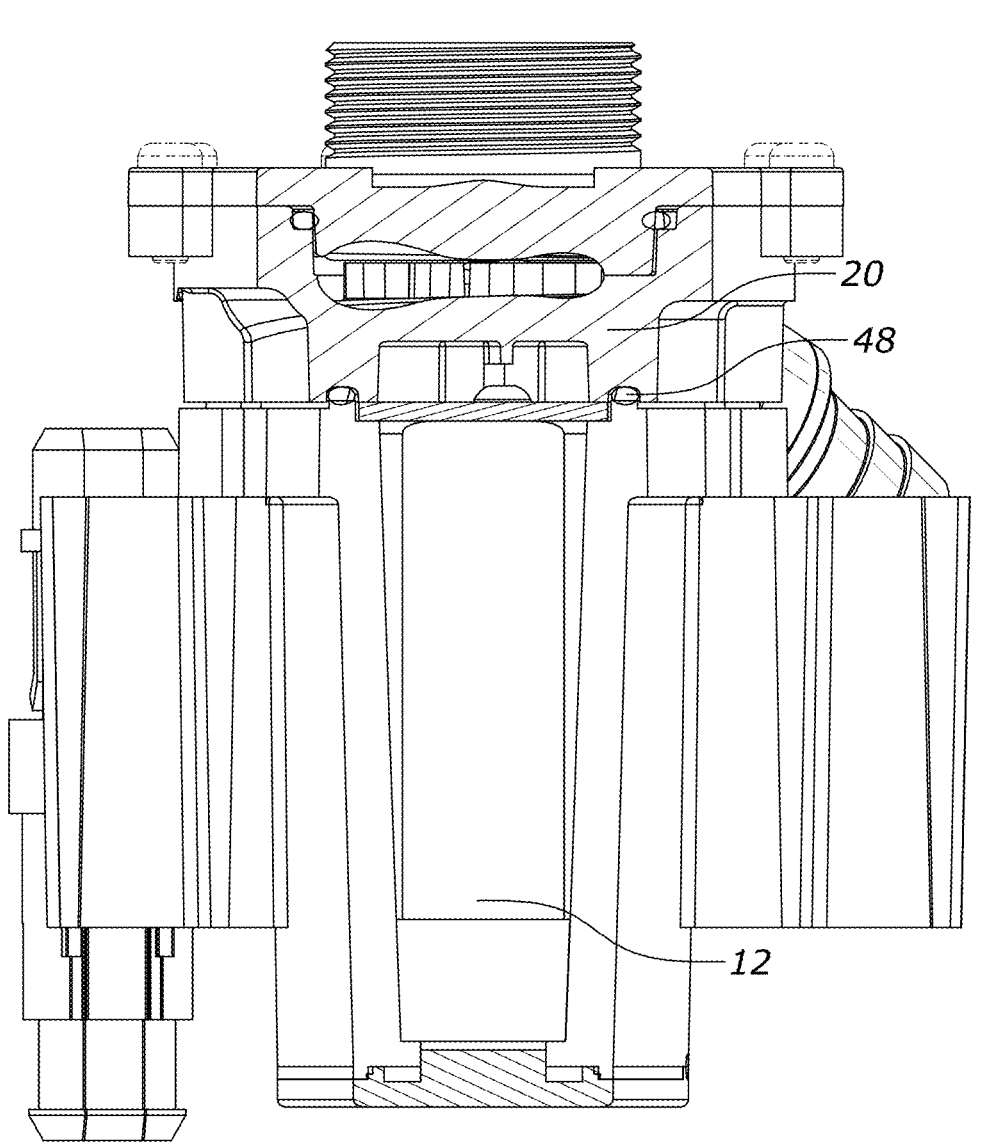
FIG. 17 is a section view of FIG. 11 along section lines 17-17 thereof.

In traditional fuel pump assemblies, the use of standard shaft end mounted motors requires installing fasteners from the shaft end of the motor. When the traditional motor is directly mounted to the pump, fasteners with seals are required to prevent leakage from the fluid chamber of the pump. These seals create potential leak paths in the assembly. The present disclosure avoids this problem through the foot mount 34 being secured to the pump assembly 10 by a motor carrier plate 54, which is clamped to the pump housing 20 and the motor carrier plate 54 eliminates the need for multiple fasteners with seals and reduces the number of potential leak paths resulting in improved sealing reliability. As illustrated in FIG. 14, the motor enclosure 30 comprises a seat 54a which corresponds with the shape of motor carrier plate 54 to create a seated arrangement to secure the motor carrier plate 54 to the motor enclosure 30, as illustrated in FIG. 13.

Figure 24:
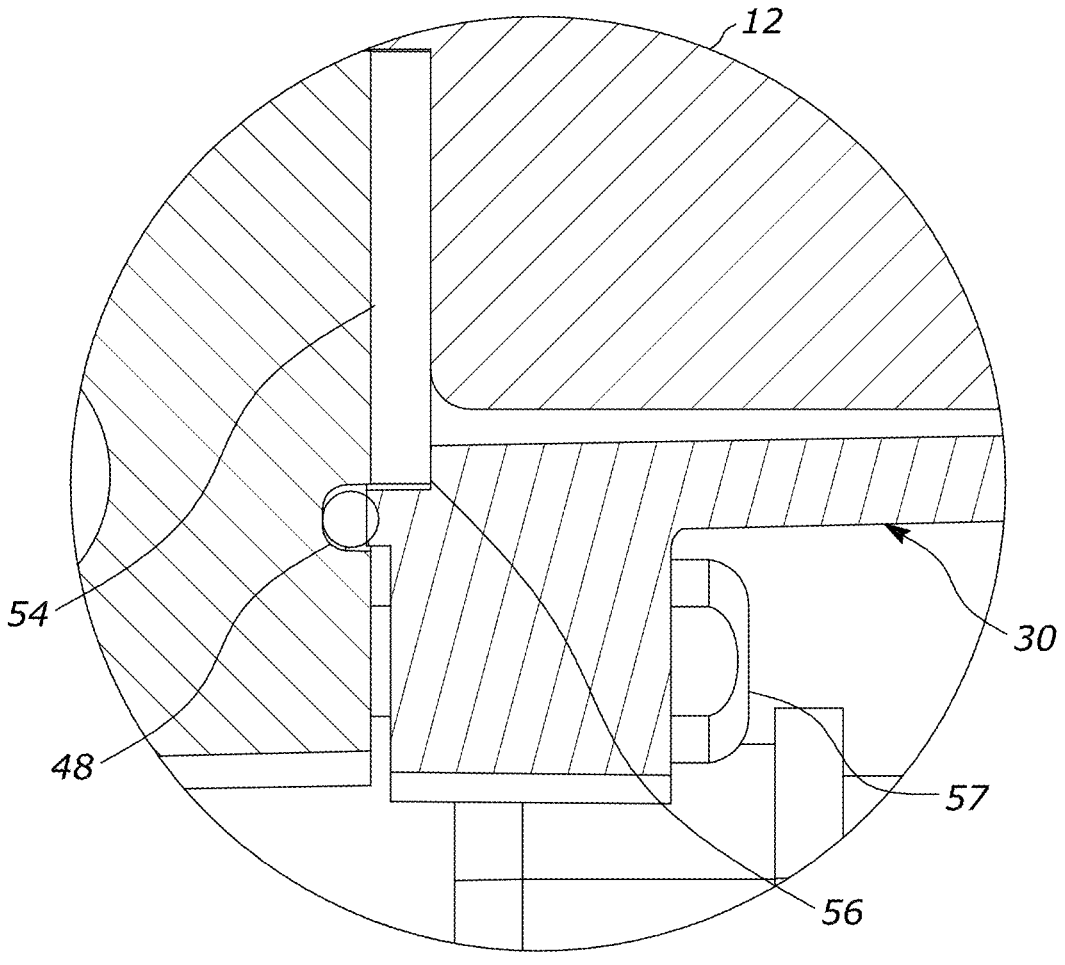
FIG. 24 is a magnified view of FIG. 23A showing a motor carrier plate.

FIG. 24 illustrates the motor shroud carrier plate 54 coupled to the motor shroud 30. The motor shroud 30 clamps motor carrier plate 54 in place to secure it and the foot mount 34 to the pump housing 20 with motor clamp 56. In one example embodiment of the present disclosure, motor clamp 56 comprises a fastener used to sandwich the carrier plate 54 between the motor shroud 30 and pump housing 20 as illustrated in, for example, FIG. 12. One of ordinary skill in the art, after reviewing the present disclosure, would understand that alternative coaxial hole arrangements may be used instead. The motor 12 mounted in this configuration would traditionally be affixed to the assembly housing 28 by way of fasteners. However, in the present disclosure, by utilizing a motor shroud 30 that interfaces directly with and couples to the motor carrier plate 54, the use of the additional fasteners is eliminated and the physical size (diameter) of the motor carrier plate is minimized in comparison to traditional fuel pumps. Advantageously, this reduces the total number of fasteners 57 and the labor required to assemble the pump assembly 10. The motor carrier plate 54, and more particularly, foot mount 34, is also oriented through an alignment tab 58 (not shown) integrally molded into the pump housing 20 before fastener 57 secures the foot mount 34 into place (see FIG. 13).

Advantageously, the compact fluid transfer pump assembly 10 is very cost effective in its construction because of its use of standard motor platforms and the use of injection molded components, such as foot mount 34 and integral connector mounting point 60. The use of injection molded pump components in the present disclosure allows the incorporation of critical pump geometry into each half of the assembly housing 28 without post processing, i.e. machining. When combined with ultrasonic welding, complex geometries can be created that would traditionally require significantly more expensive, heavy components that require more costly manufacturing methods to achieve the functions of the present disclosure. The injected molded component design methodology allows for the outlet 26 geometry to be angled from a main axis A (FIG. 20) of the pump assembly 10. The angle helps to improve tank clearance, when used in connection with a fluid supply or tank, and a hose wrap (not shown) when installed in a receiving pocket in the tank.

An outlet hose barb 26 (see FIG. 25) extending from the pump housing 20 may be ultrasonically welded to the pump housing in one example embodiment of the present disclosure. In another example embodiment, the outlet hose barb 26 is spin welded, and in yet another example embodiment, the outlet hose barb 26 comprises a flanged joint to the pump housing 20. This allows the size of the internal flow features within the pump housing 20 to be appropriately sized for a set target flow rate and allows a diverging flow path on the outlet geometry of the pump housing 20, which is an advantageous feature on rotodynamic pumps such as the present disclosure, as would be understood by one of ordinary skill in the art.

Figure 25:
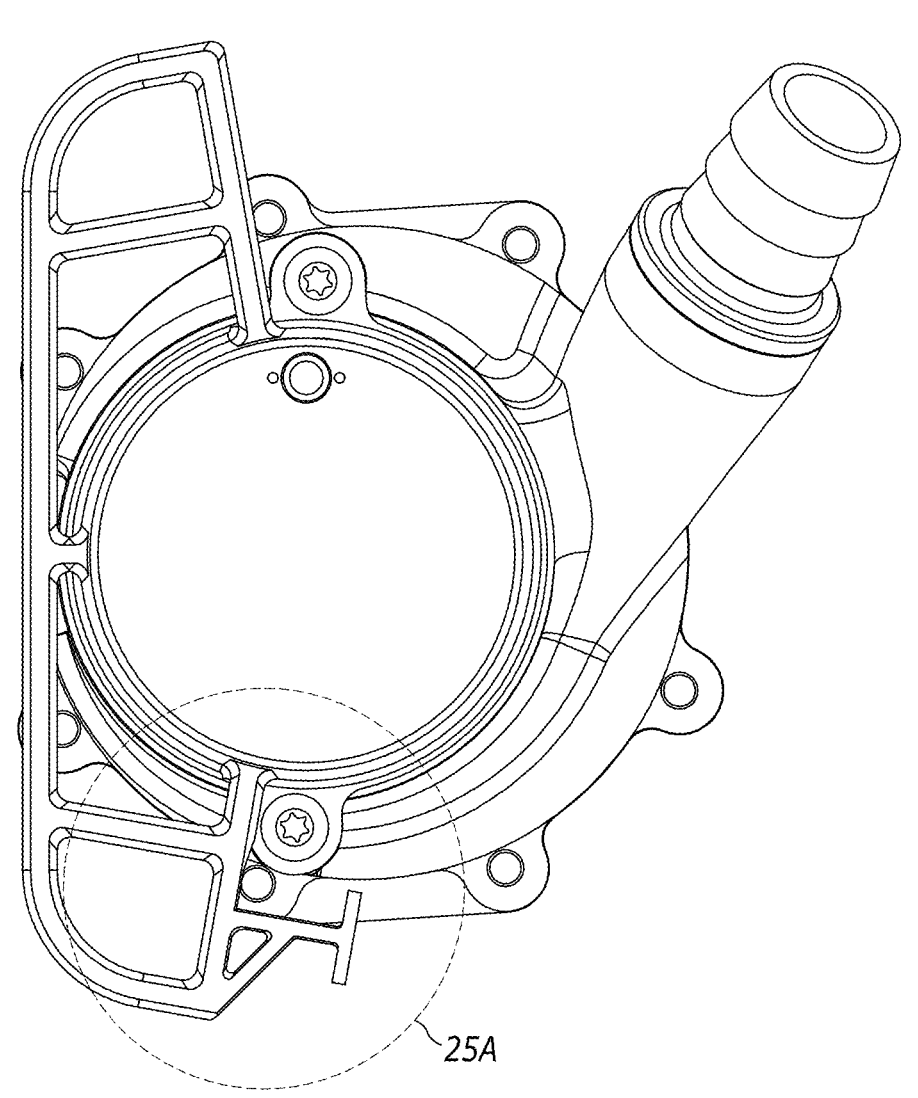
FIG. 25 illustrates a bottom plan view of a compact fluid transfer pump in accordance with one example embodiment of the present disclosure.
Figure 25A:
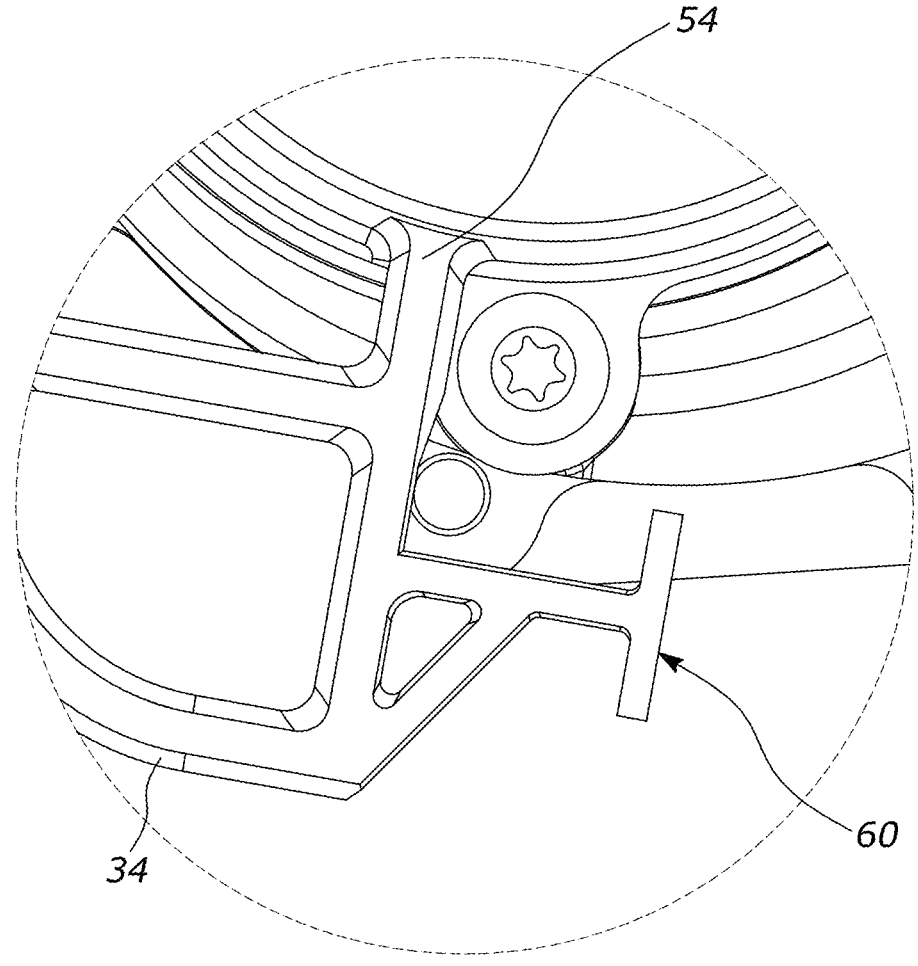
FIG. 25A is a magnified view of portion FIG. 25A of FIG. 25 indicated in the circle.

FIGS. 25, 25A, and 26 illustrate a motor shroud 30 coupled to the foot mount 34 having an integrated connector mounting point 60. One example embodiment of the motor shroud 30 integrated connector mounting point 60 is designed to be coupled with a commercially available connector to the power supply or battery 14 and could be changed to accommodate any number of available connectors. In one example embodiment, the integrated connector mounting point 60 comprises a T-shaped piece extending from foot mount 34. One of ordinary skill in the art, after reviewing the present disclosure, would understand that a plurality of shapes and sizes of mounting points would be feasible. FIG. 26 shows the coupling between the mounting point 60 and a commercially available connector 61.

The compact fluid transfer pump assembly 10 may dispense fuels or other fluids from a mobile tank in one example embodiment, or a caddy on wheels in another example embodiment.

Figure 27:
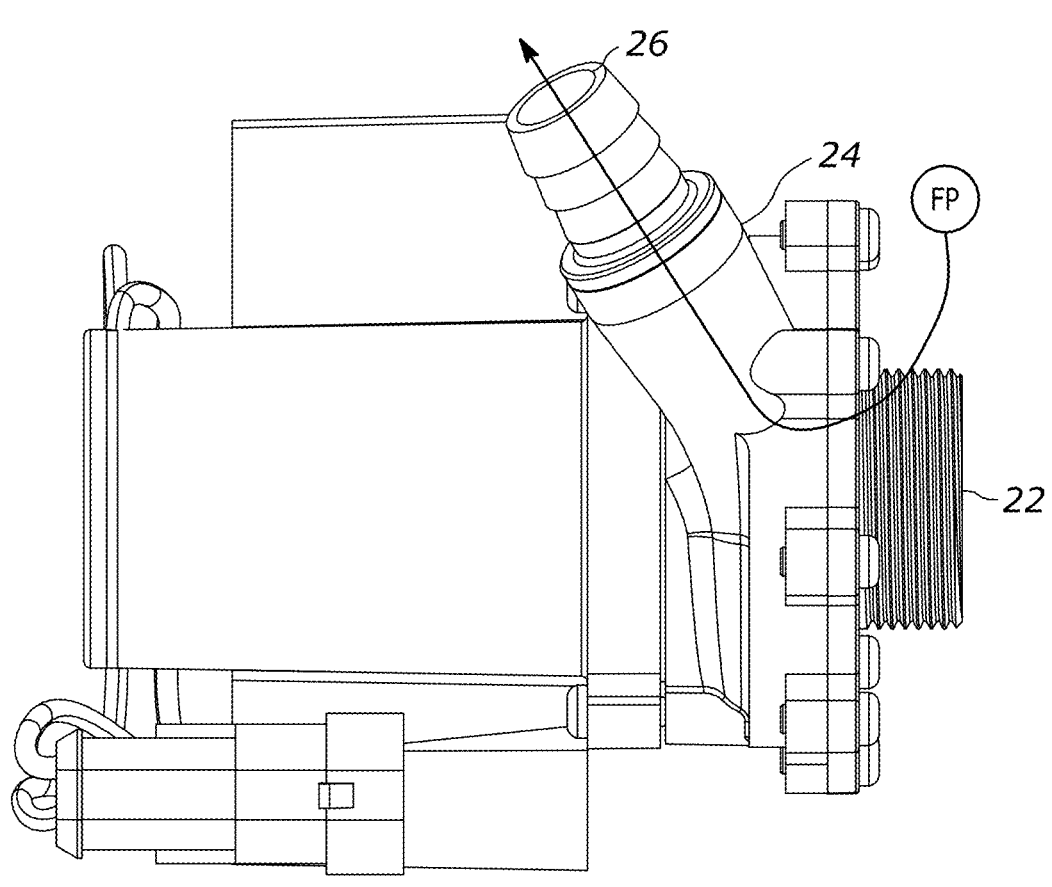
FIG. 27 shows an inlet and outlet flow direction in a compact fluid transfer pump assembly in relation to a tank alignment feature in accordance with one illustrated example embodiment of the present disclosure.

A typical operation of the pump assembly 10 will now be described. The pump assembly 10 may be attached to a corresponding tank, fluid supply, or caddy with the assistance of the anti-rotation foot 34. An inlet 22 is aligned with the tank, fluid supply, or caddy and may be coupled to the portable fuel container through a threaded coupling. Once the pump assembly 10 is attached to a portable fuel container, the motor 12 is activated by an activation switch (not shown). By enabling the switch, the power source 14 then energizes the motor 12, which in turn energizes and creates centrifugal force in a pump impeller 18, moving the fluid in the portable fuel container into the pump assembly 10 through the inlet 22, along flow path FP and through the impeller 18, and eventually out of the pump assembly 10 through outlet 24, which is shown in FIG. 27. The fluids then exit the pump assembly 10 through a coupled outlet barb 26, which extends from outlet 24, and may further travel through an attached piece of tubing to a desired location.

Figure 23A:
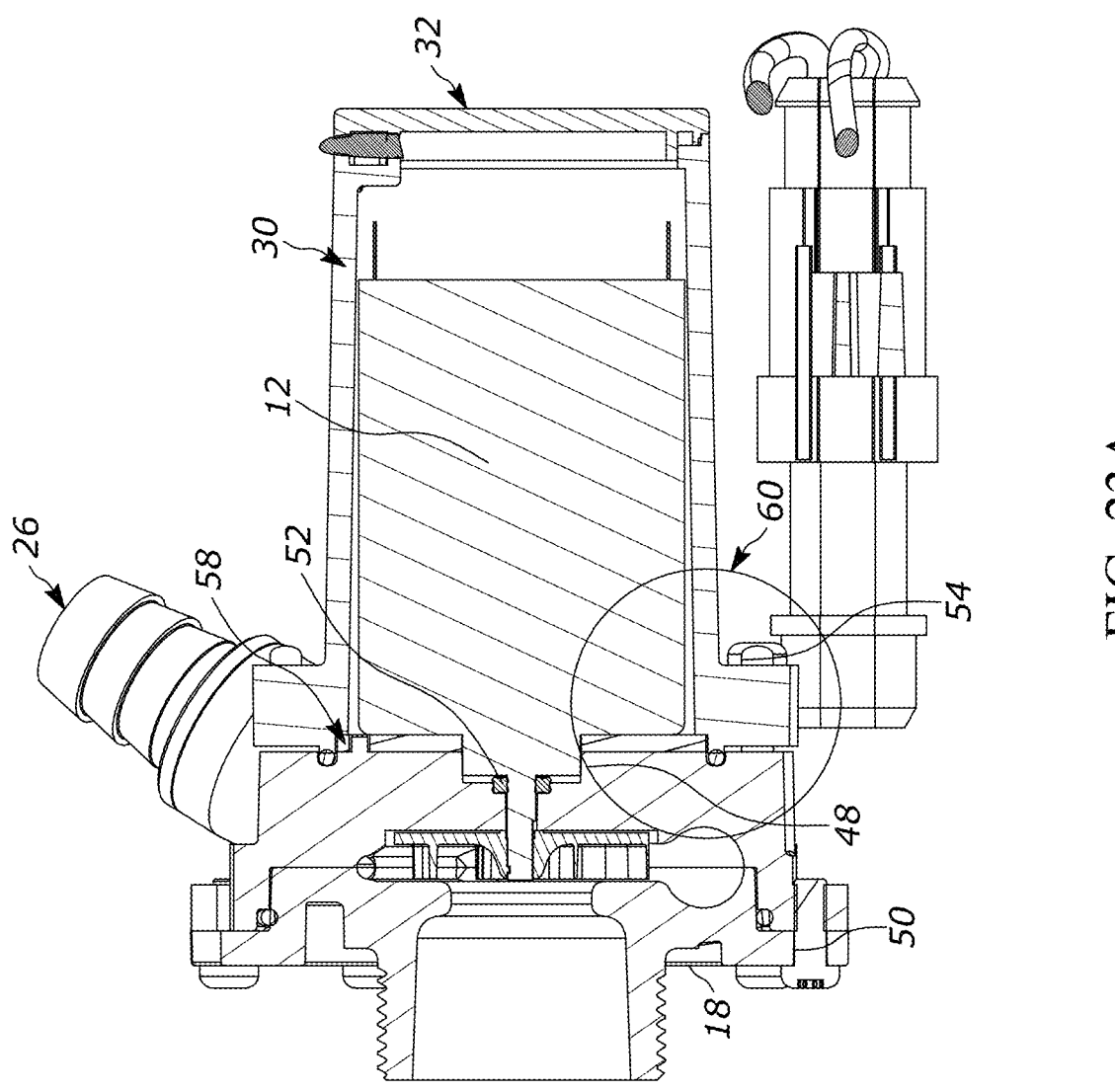
FIG. 23A is cross-sectional view of a compact fluid transfer pump assembly along section line 23A-23A of FIG. 23 showing a tank alignment feature in accordance with one illustrated example embodiment of the present disclosure.

The pump impeller 18, as shown in FIG. 23A, is retained by a molded protrusion at the end of impeller 18, where the protrusion ends form a plurality of sections featuring slight deformation to assist in assembly of the pump assembly 10. In this example embodiment, the molded protrusion of the impeller 18 provides axial locating functions in opposing directions, while traditional retaining rings or fasteners can only limit in one direction.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. In one non-limiting embodiment the terms are defined to be within for example 10%, in another possible embodiment within 5%, in another possible embodiment within 1%, and in another possible embodiment within 0.5%.

The term "coupled" as used herein is defined as connected or in contact either temporarily or permanently, although not necessarily directly and not necessarily mechanically. A device or structure that is "configured" in a certain way is configured in at least that way, but may also be configured in ways that are not listed. The term "integral" as used herein unless defined otherwise means configured in such a way that separation would require destruction to the parts or the assembly of the parts.

It should be appreciated by those of ordinary skill in the art after having the opportunity of reviewing the drawings and/or specification of the present disclosure that it may include one or more embodiments, e.g., E1, E2, . . . . En and that each embodiment E may have multiple parts A1, B1, C1 . . . . Zn that (without further description) could be combined with other embodiments En, embodiment parts e.g. A1, C1, or lack of parts originally associated with one or all embodiments En, or any combination of parts and/or embodiments thereof. It should further be appreciated that an embodiment En may include only one part e.g. A1 or a lesser number of parts e.g. B1, C1 of any embodiment or combination of embodiments that was described or shown in the specification and/or drawings, respectively in ways not enumerated or illustrated.

To the extent that the materials for any of the foregoing embodiments or components thereof are not specified, it is to be appreciated that suitable materials would be known by one of ordinary skill in the art for the intended purposes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A compact fluid transfer pump assembly comprising:

a pump enclosure comprising a pump cavity sized to house a plurality of pump components, said pump enclosure having an inlet for receiving fluid;

a motor enclosure coupled to said pump enclosure, the motor enclosure comprising a circular first end spaced by a cylindrical wall having an inner and an outer surface to a circular second end, a motor enclosure cavity formed therebetween within said cylindrical wall, the circular first end having an opening for receiving a motor, the circular second end formed by a bell wall, the motor enclosure removably couplable with a tank;

an anti-rotation foot removably coupled with said motor enclosure and extending from said outer surface of said cylindrical wall of said motor enclosure, said anti-rotation foot to assist in coupling said pump assembly with an external fluid reservoir;

wherein said anti-rotation foot is in contact with and coupled to a motor carrier plate, said motor carrier plate being coupled to and in contact with said motor enclosure; and wherein said motor carrier plate is in contact with a motor enclosure seat formed within said inner surface of said cylindrical wall of said motor enclosure, said motor enclosure seat sized to receive and be coupled with said motor carrier plate, said motor carrier plate and said motor enclosure seat forming a seated arrangement.

2. The compact fluid transfer pump assembly of claim 1, further comprising a plurality of elongated channels of said anti-rotation foot, wherein said plurality of elongated channels are asymmetrical with each other.

3. The compact fluid transfer pump assembly of claim 2 further comprising a connector mounting point extending from one of said plurality of elongated channels of said anti-rotation foot.

4. The compact fluid transfer pump assembly of claim 3, wherein said connector mounting point comprises a T-shape.

5. The compact fluid transfer pump assembly of claim 1, wherein said motor carrier plate is further coupled with said motor enclosure seat by a motor clamp.

6. The compact fluid transfer pump assembly of claim 5, wherein said motor clamp comprises a counterbore formed with said motor carrier plate.

7. The compact fluid transfer pump assembly of claim 5, wherein said motor clamp further couples said anti-rotation foot to said motor enclosure of said compact fluid transfer pump assembly.

8. The compact fluid transfer pump assembly of claim 1 further comprising a modular wiring joint arrangement.

9. The compact fluid transfer pump assembly of claim 1, wherein said motor enclosure further comprises a wire constraint apparatus formed within said bell wall of said second end.

10. The compact fluid transfer pump assembly of claim 1 further comprising an outlet hose barb extending from said pump enclosure, said outlet hose barb providing an outlet for fluid that enters said pump enclosure through said inlet, wherein fluid flows between said inlet and said outlet hose barb along a fluid flow path.

11. A method of assembling a compact fluid transfer pump assembly comprising the steps of:

providing a pump enclosure comprising a pump cavity sized to house a plurality of pump components, said pump enclosure having an inlet for receiving fluid and an outlet hose barb having an outlet for the passage of fluid, wherein fluid flows between said inlet and said outlet hose barb along a fluid flow path;

providing a motor enclosure coupled to the pump enclosure, the motor enclosure comprising a circular first end spaced by a cylindrical wall having an inner and an outer surface to a circular second end, forming a motor enclosure cavity therebetween within said cylindrical wall, the circular first end having an opening for receiving a motor, the circular second end formed by a bell wall, the motor enclosure removably couplable with a tank; and providing an anti-rotation foot removably coupled with said motor enclosure and extending from said outer surface of said cylindrical wall of said motor enclosure, said anti-rotation foot comprising a plurality of elongated channels to assist in coupling said pump assembly with an external fluid reservoir, said anti-rotation foot having an integral connector mount extending from one of said plurality of said elongated channels.

12. The method of assembling a compact fluid transfer pump assembly of claim 11, the method further comprising the step of coupling a connector having a passage for a power cable to a plurality of electrical components within said compact fluid transfer pump assembly to said integral connector mount.

13. The method of assembling a compact fluid transfer pump assembly of claim 11 further comprising the steps of:

providing a motor carrier plate, forming a motor carrier plate seat within said inner surface of said cylindrical wall of said motor enclosure;

coupling said motor carrier plate with said motor carrier plate seat of said motor enclosure; and coupling said motor carrier plate with said anti-rotation foot to form said compact fluid transfer pump assembly.

14. The method of assembling a compact fluid transfer pump assembly of claim 11 further comprising the step of forming a double strain relieved wire joint within said end bell of said motor enclosure.

15. The method of assembling a compact fluid transfer pump assembly of claim 11 further comprising the step of ultrasonically welding a double strain relieved wire joint within said end bell of said motor enclosure.

16. A compact fluid transfer pump assembly comprising:

a pump enclosure comprising a pump cavity sized to house a plurality of pump components, said pump enclosure having an inlet for receiving fluid;

a motor enclosure coupled to the pump enclosure, the motor enclosure comprising a circular first end spaced by a cylindrical wall having an inner and an outer surface to a circular second end, a motor enclosure cavity formed therebetween within said cylindrical wall, the circular first end having an opening for receiving a motor, the circular second end formed by a bell wall, the motor enclosure removably couplable with a tank;

an anti-rotation foot removably coupled with said motor enclosure and extending from said outer surface of said cylindrical wall of said motor enclosure, said anti-rotation foot comprising a plurality of elongated channels to assist in coupling said pump assembly with a fluid reservoir;

a motor carrier plate removably coupled with said anti-rotation foot and said motor enclosure, said motor carrier plate forming a seated arrangement with a motor carrier plate seat formed within said inner surface of said cylindrical wall of said motor enclosure;

a wiring joint formed within said bell wall of said motor enclosure, said wiring joint having first and second wire strain reliefs; and a potting cavity formed within said bell wall of said motor enclosure between said first and second wire strain reliefs.

17. The compact fluid transfer pump assembly of claim 16 further comprising a motor carrier plate clamp to further secure said motor carrier plate with said motor carrier plate seat and said anti-rotation foot.

18. A compact fluid transfer pump assembly comprising:

a pump enclosure comprising a pump cavity sized to house a plurality of pump components, said pump enclosure having an inlet for receiving fluid;

a motor enclosure coupled to said pump enclosure, the motor enclosure comprising a circular first end spaced by a cylindrical wall having an inner and an outer surface to a circular second end, a motor enclosure cavity formed therebetween within said cylindrical wall, the circular first end having an opening for receiving a motor, the circular second end formed by a bell wall, the motor enclosure removably couplable with a tank;

an anti-rotation foot removably coupled with said motor enclosure and extending from said outer surface of said cylindrical wall of said motor enclosure, said anti-rotation foot to assist in coupling said pump assembly with an external fluid reservoir;

a plurality of elongated channels of said anti-rotation foot, wherein said plurality of elongated channels are asymmetrical with each other; and a connector mounting point extending from one of said plurality of elongated channels of said anti-rotation foot.

19. The compact fluid transfer pump assembly of claim 18, wherein said connector mounting point comprises a T-shape.

\* \* \* \* \*